(12) United States Patent
Medin et al.

(10) Patent No.: US 8,288,966 B2
(45) Date of Patent: Oct. 16, 2012

(54) COLOR DISPLAY

(75) Inventors: David L. Medin, Los Altos, CA (US);
Takatoshi Ishii, Sunnyvale, CA (US);
Yves Faroudja, Los Altos Hills, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 563 days.

(21) Appl. No.: 12/400,668

(22) Filed: Mar. 9, 2009

(65) Prior Publication Data
US 2010/0225238 A1    Sep. 9, 2010

(51) Int. Cl.
H05B 41/36    (2006.01)
(52) U.S. Cl. ............. 315/360; 315/209 R; 315/291
(58) Field of Classification Search ........... 315/185 R, 315/186, 189, 192, 193, 194, 195, 209 R, 315/210, 224, 291, 299, 302, 311, 312, 313, 315/326; 345/690, 691, 694, 698, 699, 210, 345/214
See application file for complete search history.

(56) References Cited

U.S. PATENT DOCUMENTS
7,285,923 B2 * 10/2007 Yu .................. 315/307
* cited by examiner Primary Examiner — Douglas W Owens
Assistant Examiner — Jianzi Chen
(74) Attorney, Agent, or Firm — Fish & Richardson P.C.

(57) ABSTRACT

A colored light generating element can be configured to, while in an active state, pulse between an off state and an on state. A substantially constant offset voltage or current can be applied to the colored light generating element during a predetermined time interval when the light generating element is in the off state so as to cause the colored light generating element to emit, during the off state, some amount of light greater than a minimum amount of light that the light generating element is capable of generating while part of an active system. In some implementations, two or more offset voltages or currents can be applied. Implementations may include a preprocessor configured to receive an image signal and optimize color saturation of the image signal, such as by limiting and non-linearly increasing color saturation. Implementations may include multiple colored light generating elements.

11 Claims, 16 Drawing Sheets

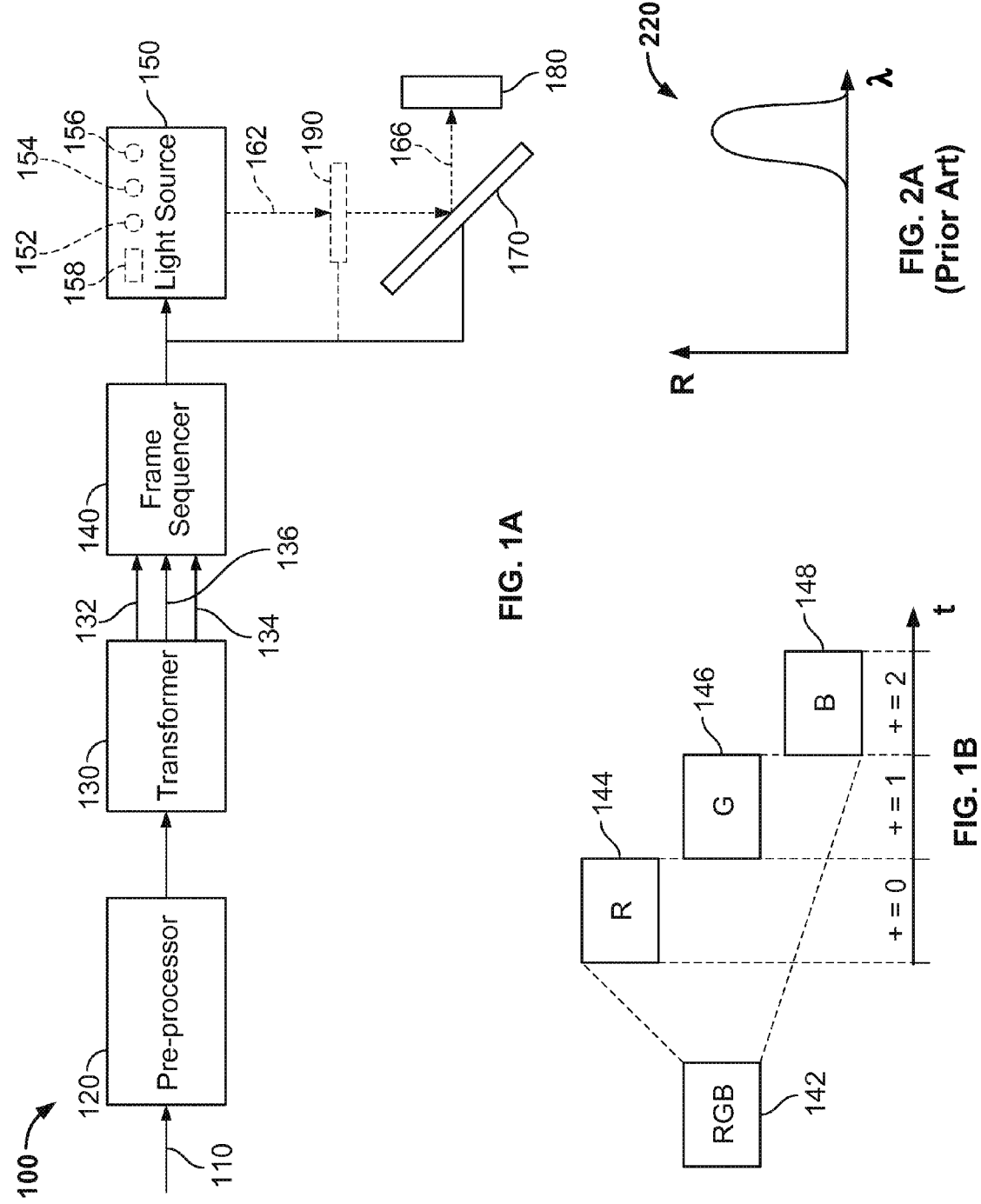

COLOR DISPLAY

TECHNICAL FIELD

The present disclosure relates to color display technologies, such as a display system using light emitting diodes.

BACKGROUND

A specific type of display device is a video projector, which takes a video signal and projects a corresponding image on a screen or other flat surface using a lens and an illumination source. Known projection systems intended for use with television or computer displays sometimes use spatial light modulators (SLM), such as a micromirror device, a liquid crystal display (LCD), or a liquid crystal on silicon (LCoS) display. A micro mirror array is a type of spatial light modulator (SLM) that includes an array of cells, each of which includes a mirror plate that can tilt about an axis and, furthermore, circuitry for generating electrostatic forces that can tilt the micro mirror plate. In a digital mode of operation, for example, the mirror plate can be tilted to stop at two positions. In an "on" position, the micro mirror reflects incident light toward a display surface to form an image pixel in an image display. In an "off" position, the micro mirror directs the incident light away from the image display.

Digital control signals are used to deflect the micro-mirrors of a micro-mirror display, as well to control the display elements of other displays, such as plasma and LCoS. These digital control signals operate in two states: an "on" state where the light is directed onto the viewing area; and an "off" state where the light is kept away from the viewing area. This has the effect that each pixel can be directed to be instantaneously displayed as black or white. Grey-scale can be provided by time multiplexing, that is, displaying during only a fraction of the time available. The percentage of time the device places the light in the "on" state versus in the "off" state determines the perceived brightness level of the pixel display—between black (all off) and white (all on). The number of possible light levels of a pixel between black and white during a given modulation time period is a function of the time period for display of the pixel, divided by the shortest modulation increment.

One example of a display system is a red-green-blue (RGB), field-sequential, light-emitting-diode-based (LED-based) micro-mirror display with a 60 Hz video source. At 60 Hz, the display is refreshed or changed each 1/60 second, or every 16.67 ms. As these RGB systems have three LEDs, one red (R), one green (G), and one blue (B), the R, G, and B fields are displayed sequentially, hence the name "field-sequential." The percentage of time allocated for each of the red, green, and blue LEDs is a function of many variables including LED efficiency and user preference. If each field is on for about 1/3 of the time, the time available for refreshing each field would be one third of the refresh rate, or 1/3 *16.67 ms, which equals 5.55 ms, which is about 5500 μs.

The details of one or more embodiments of the present disclosure are set forth in the accompanying drawings and the description below. Other features, objects, and advantages of the subject matter of the present disclosure will be apparent from the description and drawings, and from the claims.

It can also be desirable to display color images. Primary colors (sometimes called "base colors"), can include red, green, and blue. Combinations of these colors provide a color gamut recognizable by a human brain.

One technique for providing color images is to provide multiple SLMs, e.g., one for each primary RGB color. Each SLM is illuminated by a different color source, and a different set of control signals are directed to each SLM to control the individual pixels for each of the RGB colors. The three modulated color light beams are superimposed by an optical projection system to form a full-color image. While this solution generally achieves the goal of presenting a color image without substantial image artifacts or defects, it has the drawback of being relatively expensive, particularly in comparison with systems using only a single SLM. This solution also has the problem that it can be optically complex, both with respect to timing precision of the control signals and with respect to precise superimposing of the color light beams.

Another technique for providing color images is to use a single SLM but to time-multiplex, during a video frame, each RGB color in the projected light beam. Thus, in this system, each color is displayed in turn: a red portion of the image, a green portion of the image, and a blue portion of the image. A system to time-multiplex a light beam into different colors can include red, green, and blue light sources, such as produced by light emitting diodes (LEDs) or lasers. These light sources may be switched between "on" states and "off" states in order to produce a succession of red, green, and blue light sources in synchronization with signals sent to the SLM. When LEDs are used as an illumination source, a drive current or drive voltage input to the LEDs can directly affect the brightness of the display. These light sources may be switched between an "on" state and an "off" state in order to produce a succession of red, green, and blue light sources in synchronization with signals sent to the SLM. Another approach is to use a white light source and a color wheel. The color wheel is rotated by a motor, and a white light beam emitted from the white light source is sequentially filtered by the red, green, and blue filters in the color wheel to produce a sequence of red, green, and blue light in the beam.

Variants of these techniques can include time-multiplexing each color twice or more in a single original video display frame, or multiplexing each color with an additional luminance value (Y). While this technique generally achieves the goal of presenting a color image and can be less expensive than a system with three SLMs, it can also be subject to several disadvantages.

First, displays in which the multiple colors are presented to a single SLM might use a color sequencing to assure that at any specific time, only one red, green, or blue color is being presented to the SLM for display. In some instances, a color flicker may result and may be an annoyance to a human viewer. Second, time-division of each frame into three colors (or more) allows less time for those colors to be presented, with the effect that brightness may be significantly reduced (in comparison to a three SLM system). Third, a luminance signal (Y) might be added, e.g., by adding a monochromatic component, to increase general brightness of the image as perceived by the eye and brain of the observer, but this decreases the saturation of the image. Fourth, if an observer's eye is drawn across the display (either by a moving image on the display or a moving object near the display), the edges of at least some objects can appear with substantial color fringes. For example, a solid round object presented with a second object moving across it can present crescent-shaped color fringes on either side, with each crescent taking on a different color. The effect can be relatively annoying or disturbing, and can result in eye muscle fatigue. Fifth, a color gamut of a display device using LED light sources is very wide and is typically different from the color gamut of conventional devices such as cathode ray tube (CRT) or LCD devices that use conventional phosphors. For example, pure green and red color presentations may be different for an LED display device as compared to a CRT or LCD device (See FIGS. 3c and 3D for NTSC or SMPTE industry standards). So, it may be desirable to implement accurate and flexible color matching technology.

SUMMARY

A display system can be implemented with one or more colored light generating elements, such as LEDs. The colored light generating elements can be switched between on states and off states in order to display an image. A colored light generating element controller can apply a constant current offset or a constant voltage offset to one or more of the light generating elements during off states. Such a constant offset, such as a DC offset, can be applied so as to increase brightness of a light generating element during an off state.

In a general aspect, the present disclosure relates to systems and methods including a colored light generating element configured to, while in an active state, pulse between an off state and an on state. A substantially constant offset voltage or current can be applied to the colored light generating element during a predetermined time interval when the light generating element is in the off state so as to cause the colored light generating element to emit, during the off state, some amount of light greater than a minimum amount of light that the light generating element is capable of generating while part of an active system.

In another aspect, the present disclosure relates to systems and method including a colored light generating element configured to, while in an active state, pulse between an on state and two or more off states. Two or more offset voltages can be applied to the colored light generating element during predetermined time intervals when the light generating element is in the off state so as to cause the colored light generating element to emit, during the off state, some amount of light greater than a minimum amount of light that the light generating element is capable of generating while part of an active system.

In another aspect, the present disclosure relates to systems and methods including pulsing a colored light generating element between an off state and an on state and applying a substantially constant offset voltage or current to the colored light generating element. The constant offset voltage or current can be applied during a predetermined time interval when the light generating element is in an off state so as to cause the colored light generating element to emit, during the off state, some amount of light greater than a minimum amount of light that the light generating element is capable of generating while part of an active system.

In another aspect, the present disclosure relates to systems and methods including pulsing a colored light generating element between an on state and two or more off states. A first substantially constant offset voltage or current can be applied to the colored light generating element during a first predetermined time interval when the light generating element is in an off state. The first substantially constant offset voltage or current can be applied so as to cause the colored light generating element to emit, during the off state, some first amount of light greater than a minimum amount of light that the light generating element is capable of generating while part of an active system. A second substantially constant offset voltage or current can be applied to the colored light generating element during a second predetermined time interval, different from the first predetermined time interval, when the light generating element is in the off state. The second substantially constant offset voltage or current can be applied so as to cause the colored light generating element to emit, during the off state, some second amount of light greater than the minimum amount of light that the light generating element is capable of generating while part of the active system.

Implementations may include one or more of the following. A substantially constant offset voltage or current can be selected to compensate for wavelength shift of the colored light generating element or to optimize either brightness, saturation, color temperature, or power. The substantially constant offset voltage or current can be selected based upon a preference set by the user. The substantially constant offset voltage or current can be selected based upon a predetermined system parameter, which in some implementations is selected from temperature of the light generating elements or nature of information to be displayed. Some implementations may include a colored light generating element controller configured to control an amount of the substantially constant offset voltage or current. The constant offset voltage or current can be applied to the colored light generating element during the off state so as to increase brightness of the colored light generating element over time.

Some implementations may include a preprocessor. The preprocessor can include a receiver configured to receive an image signal having color saturation and brightness information. The preprocessor can include an optimizer configured to control the saturation of the image signal based upon information from the receiver. Also, the preprocessor can be configured to limit and non-linearly increase color saturation of the image signal. Further, the preprocessor can be configured to substantially preserve original color hue or saturation for colors having saturation below a predetermined saturation limit.

Some implementations may include three colored light generating elements, such as one for emitting red light, one for emitting green light, and one for emitting blue light. Each of the three colored light generating elements can be associated with a substantially constant offset voltage or current. That is, for example, each of the three colored light generating elements can have a substantially constant offset voltage or current associated therewith. The constant offset voltages or currents can be present during the on or off states of each of the three colored light generating elements. The constant offset voltages or currents can be selected or controlled such as described above regarding constant offset voltage or current. A substantially constant offset voltage or current can be applied to one or more of the three colored light generating elements during a corresponding off state so as to increase brightness of the colored light generating element over time.

Implementations may include one or more of the following advantages. A single SLM system can have increased brightness without appreciably degrading the saturation or hue of the displayed image. Increased achievable brightness may permit use of relatively smaller, less powerful, lighter, simpler, or less costly components. Color fringing and color flicker can be reduced, or lower frame rates may be acceptable to adequately limit color fringing. Lower acceptable frame rates may permit use of simpler, lighter, less precise, or less costly components. Reducing the frame rate may also reduce the power consumption of the drive electronics. Power efficiency of the light source, such as of LEDs, may be improved. Exact color matching with conventional display devices or an industry standard color gamut can also be achieved.

BRIEF DESCRIPTION OF THE DRAWINGS

FIG. 1A is a block diagram of a display system.
FIG. 1B is a schematic representation of an image frame.

FIGS. 2A, 2C, and 2E are illustrative spectra of red, green and blue light beams used to illuminate SLMs in prior art systems.

DETAILED DESCRIPTION

Figure 2B:
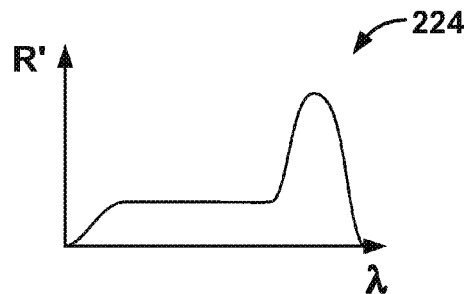
FIGS. 2B, 2D, and 2F are illustrative spectra of "red", "green" and "blue" light beams, respectively, used to illuminate an SLM according to an implementation of a display device.

Where a display system includes colored light generating elements, such as LEDs, overall brightness of an image can be increased by applying a bias voltage or current to one or more of the colored light generating elements. This bias voltage or current can be applied, for example, during one or more predetermined time intervals during which a corresponding colored light generating element is in an off state. Increasing brightness in this manner can optically desaturate colors of the image. To compensate, color saturation of an image signal can be limited or truncated, by combining one or more colored lights, to a predetermined saturation limit and overall color saturation can then be increased through video signal processing to fill the range of available color saturation, thereby "supersaturating" certain colors of the image signal. For example, an electronic circuit can increase saturation of color components in proportion to one another, and the increase in an output saturation may be non-linear with respect to an input saturation. When the supersaturated image signal is displayed, increased brightness of the light generating elements can optically desaturate display of the image. Use of the additional light can increase a maximum achievable brightness of the displayed image for a particular display system.

FIG. 1A is a block diagram of a display system 100. An image signal 110 is received by a preprocessor 120. The image signal 110 can include information about a color, such as brightness, saturation, and hue. In some implementations, the image signal is a YUV signal that includes one luminance ("luma") component and two chrominance ("chroma") components. The luminance component can be referred to as the "Y" component and can include information about the brightness of a color. The chroma components can be referred to as "U" and "V" and can include information about hue and saturation of a color. In other implementations, the image signal 110 can be a YIQ signal, an RGB signal, a CMYK signal, an NTSC signal, a PAL signal, an HDTV signal, or some other image signal. Where the image signal 110 is in a format that does not include a separate chroma component, the image signal 110 can be converted to such a format that does include a chroma component before further processing by the preprocessor 120. For example, the image signal 110 can be converted to a format in which at least one component includes chroma information but does not include any luma information. For example, the image signal 110 can be converted to a signal having two chroma components, such as a YUV signal.

The preprocessor 120 adjusts chroma characteristics of the image signal, as described in more detail below. The preprocessor 120 is in signal communication with a color converter 130, which transforms the image signal 110, as adjusted by the preprocessor 120, into a signal suitable for display, such as a red-green-blue ("RGB") signal having a red component 132, a green component 134, and a blue component 136. The converter 130 is in signal communication with a frame sequencer 140, which sequences the RGB signal into time-sequential frames 142 (FIG. 1B). In some implementations, each time sequential image frame includes a red color frame 144, a green color frame 146, and a blue color frame 148, which are also sequential in time, t, as illustrated in FIG. 1B, the red color frame 144 during t=0, the green color frame 146 during t=1, and the blue color frame 148 during t=2. When displayed at a sufficiently high frame rate, the time-sequential color frames are "integrated" by the human eye and brain, and are viewed as a single full-color image. Alternatively, the converter 130 can transform the image signal 110 into a CMYK signal or some other suitable display signal.

The frame sequencer 140 can be in signal communication with a light source 150. In some implementations, the light source 150 generates a light beam 162 with a repeating sequence of different colors, e.g., red, green, and blue. In some implementations, the light source 150 includes three light generating elements that can be light emitting diodes ("LEDs"): e.g., a red LED 152, a green LED 154, and a blue LED 156 and one LED drive controller 158 configured to control intensity of the light beam 162 from these LEDs. In some other implementation, three lasers having red, green, and blue wavelengths, respectively, can also be used in place of LEDs 152, 154, 156. The light source 150 can be configured to direct light beam 162 toward a spatial light modulator ("SLM") 170. The SLM 170 can be a micromirror array, as described above, and can be in signal communication with the frame sequencer 140. In some implementations, the SLM 170 can include an LCoS display, an SLM, or some other suitable light modulating display. The SLM 170 can modulate the light beam 162 to direct modulated light 166 toward a display 180 to form a color sequenced image, which is then "integrated" as discussed above to be viewed as a full-color image.

In some other implementations, a color filter 190 is positioned in a path of the light beam 162 between the light source 150 and the SLM 170. Alternatively, the color filter 190 could be positioned in a path of modulated light between the SLM and a display. In some other implementations, the light source 150 can be a constant source of white light that is not responsive to the image signal 110. In some alternative implementations, the light source 150 is in signal communication with the converter 130, and the LED drive controller 158 modifies intensity of the light beam 162 from these LEDs 152, 154, 156 instead of a color filter 190. In some implementations, the display system 100 can include a liquid crystal display (LCD).

Figure 2C:
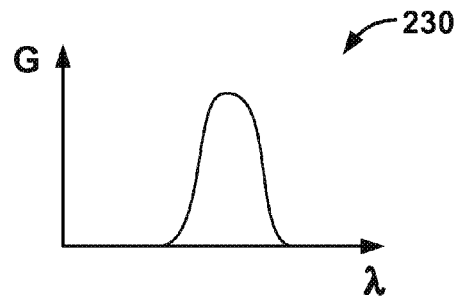
Figure 2D:
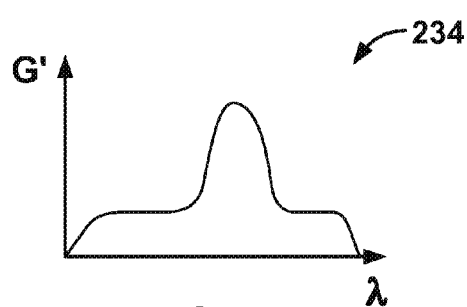
Figure 2E:
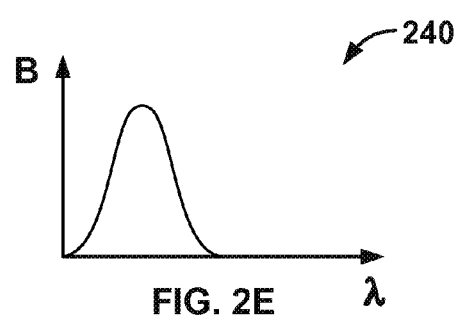

FIGS. 2A, 2C, and 2E are illustrative spectra of a first red light beam 220, a first green light beam 230, and a first blue light beam 240 used to illuminate an SLM in prior art systems. Each of the three illustrated light beams 220, 230, 240 includes light near red, green, and blue wavelengths, respectively. Each of the first red, green, and blue light beams 220, 230, 240 can be used during the red color frame 144, the green color frame 146, and the blue color frame 148 of an image frame 142.

Figure 2F:
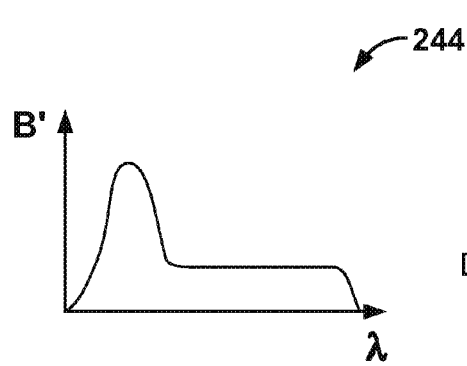

FIGS. 2B, 2D, and 2F are illustrative spectra of a second red light beam 224, a second green light beam 234, and a second blue light beam 244 used to illuminate an SLM 170 (or which are directed onto a display if the system uses a color wheel placed after the SLM 170, i.e., between the SLM 170 and a display) according to an implementation of the display system 100. In particular, each light beam includes light of the primary color as well as light of other colors, but at a lower intensity than the light of the primary color, e.g., 1% to 20% of the intensity, such as 10% of the intensity. The exact range of intensities of the other colors, that is, of the secondary images, depends on many factors which could include user preference, video content, and ambient lighting. As an example, where the image signal 110 is a black and white computer presentation, it may be desirable to have all of the colors nearly or completely "on" simultaneously. Conversely, if the image signal 110 had highly vibrant colors and the ambient lighting is such that the desired color would otherwise appear too desaturated, it may be desirable to have one or more of the secondary colors nearly or completely "off." The second red, green, and blue light beams 224, 234, 244 can be used during the red color frame 144, the green color frame 146, and the blue color frame 148 of an image frame 142, respectively. The image during the red color frame 144 can thus include some intensity of green and blue light, albeit at lower intensity than the red light. Similarly, the image during the green color frame 146 can include some intensity of red and blue light, albeit at lower intensity than the green light, and the image during the blue color frame 148 can include some intensity of red and green light, albeit at lower intensity than the blue light.

The second red light beam 224, for example, includes light from most or substantially all of the colors of visible light, such as red, green, and blue. Overall brightness of the second red light beam 224 can therefore be greater than that of the first red light beam 220. However, where the first and second red light beams 220, 224 include a same intensity of light at red wavelengths, the second red light beam 224 may have a lower saturation of red than the first red light beam 220. Similarly, the second green and blue light beams 234, 244 may have a lower saturation than the corresponding first green and blue light beams 230, 240. The display system 100 can compensate for this loss of saturation, which can be referred to as "desaturation," in order to faithfully (or more faithfully) reproduce a color saturation of an image signal 110. This compensation can be achieved by increasing a saturation of the image signal 110, which can be referred to as "supersaturation."

Figure 2G:
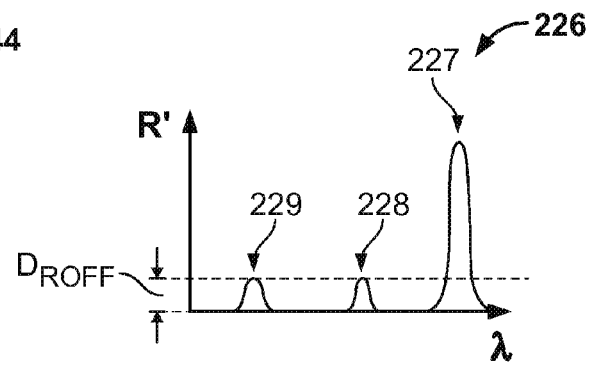
FIGS. 2G, 2H, and 2I are illustrative spectra of red, green, and blue light beams, respectively, used to illuminate an SLM according to an alternative implementation of a display device.
Figure 2H:
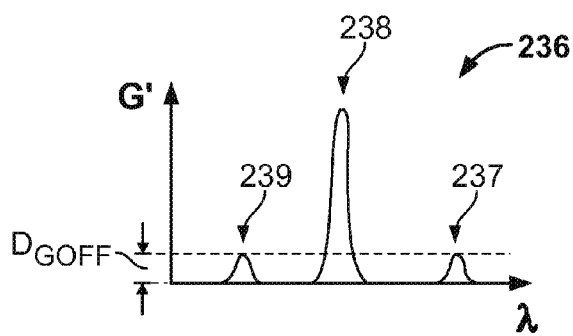
Figure 2I:
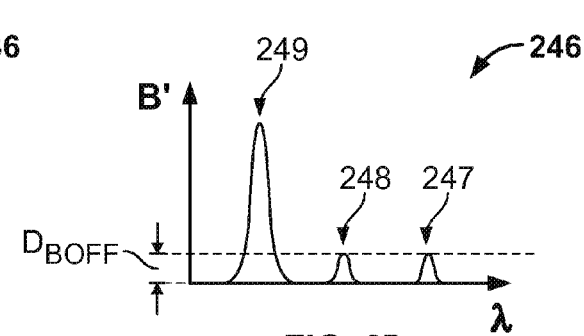

FIGS. 2G, 2H, and 2I are alternative illustrative spectra of a third red light beam 226, a third green light beam 236, and a third blue light beam 246 used to illuminate an SLM 170 according to an alternative implementation of the display system 100. The third red light beam 226, for example, predominantly includes an intensity of light near red wavelengths 227. The third red light beam 226 also includes some intensity of light near green wavelengths 228 and some intensity of light near blue wavelengths 229. The third green light beam 236 similarly includes some intensity of red wavelengths 237 and blue wavelengths 239. The third blue light beam similarly includes some intensity of red wavelengths 247 and green wavelengths 248. Such a spectral distribution can be generated, for example, in a system with the red LED 152, green LED 154, and blue LED 156 (FIG. 1) by driving the LEDs such that in any particular color frame, the primary color LED is driven at higher intensity than the other two LEDs (which are themselves driven at a non-zero intensity).

Figure 2J:
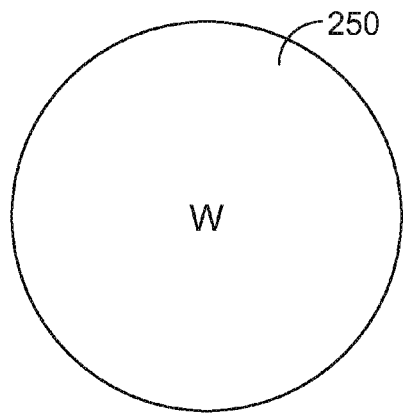
FIG. 2J is a graphical representation of a white channel.
Figure 2K:
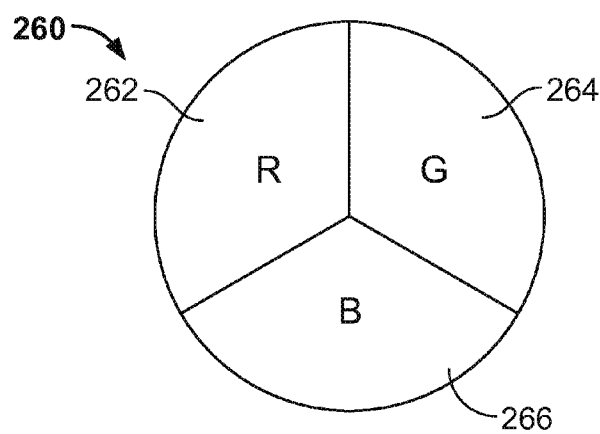
FIG. 2K is a graphical representation of an RGB color wheel related to FIGS. 2A, 2C, and 2E in prior art systems.
Figure 2L:
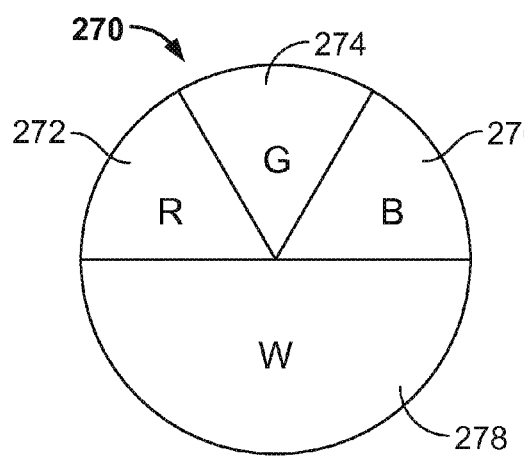
FIG. 2L is a graphical representation of a color wheel with RGB and a separate white channel.
Figure 2M:
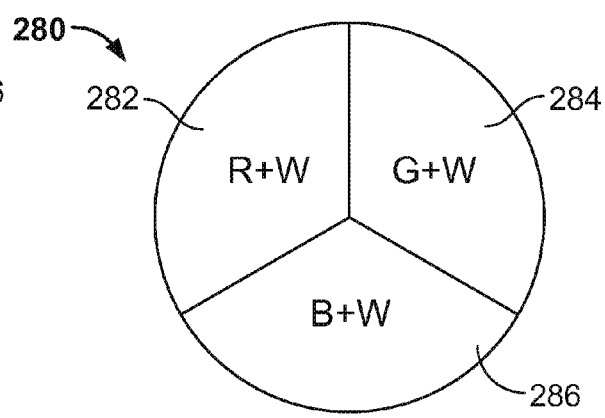
FIG. 2M is a graphical representation of a color wheel in which each RGB color segment has a white light component as shown in FIGS. 2B, 2D, and 2F.
Figure 2N:
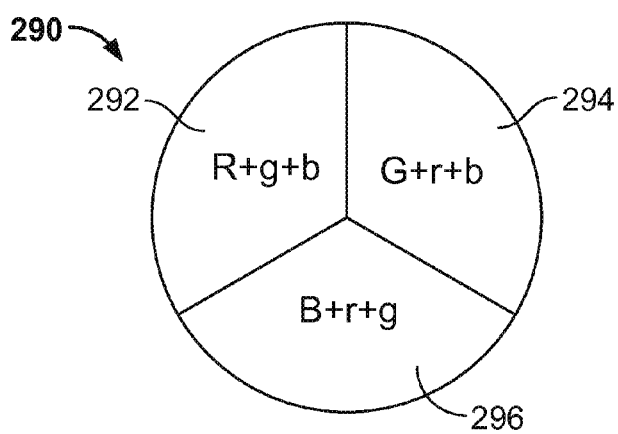
FIG. 2N is a graphical representation of a color wheel in which each RGB color segment includes light of other colors as shown in FIGS. 2G, 2H, and 2I.
Figure 2O:
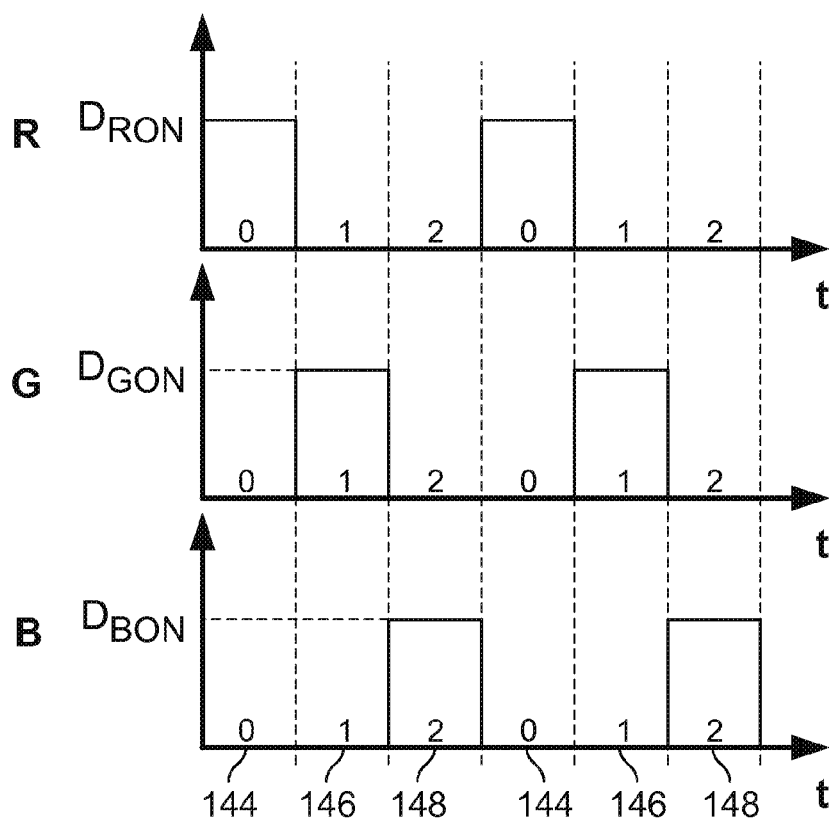
FIG. 2O is an illustrative graph of light beam intensity as a function of time according to prior art systems as shown in FIGS. 2A, 2C, 2E and FIG. 2K.
Figure 2P:
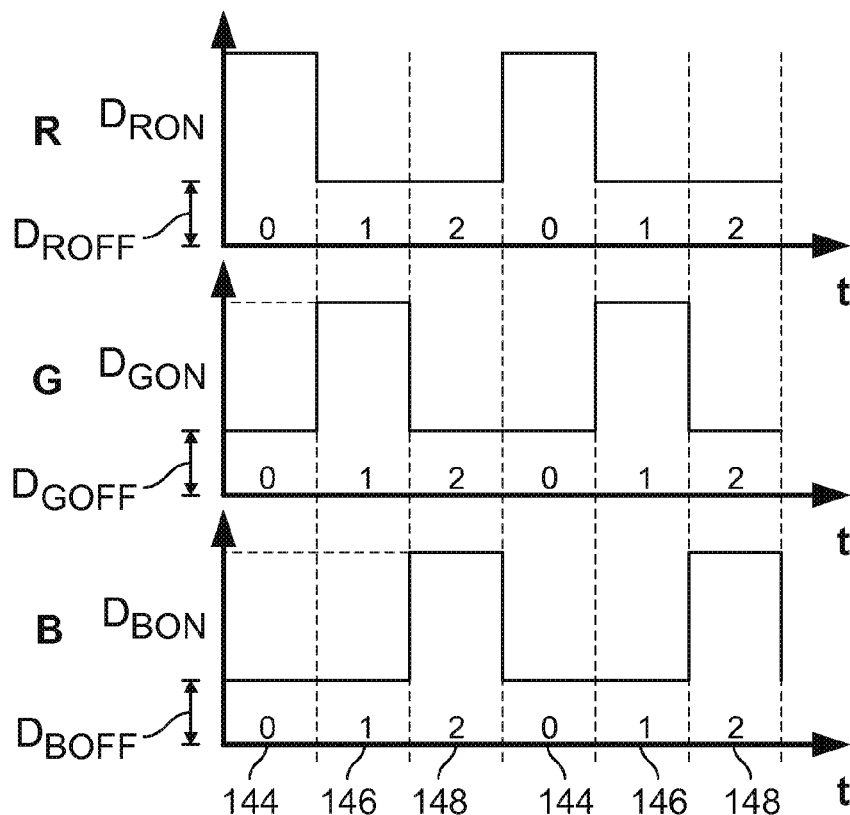
FIGS. 2P and 2Q are illustrative graphs of light beam intensity as a function of time related to FIGS. 2B, 2D, 2F-2I, 2M, and 2N according to implementations of a display device.
Figure 2Q:
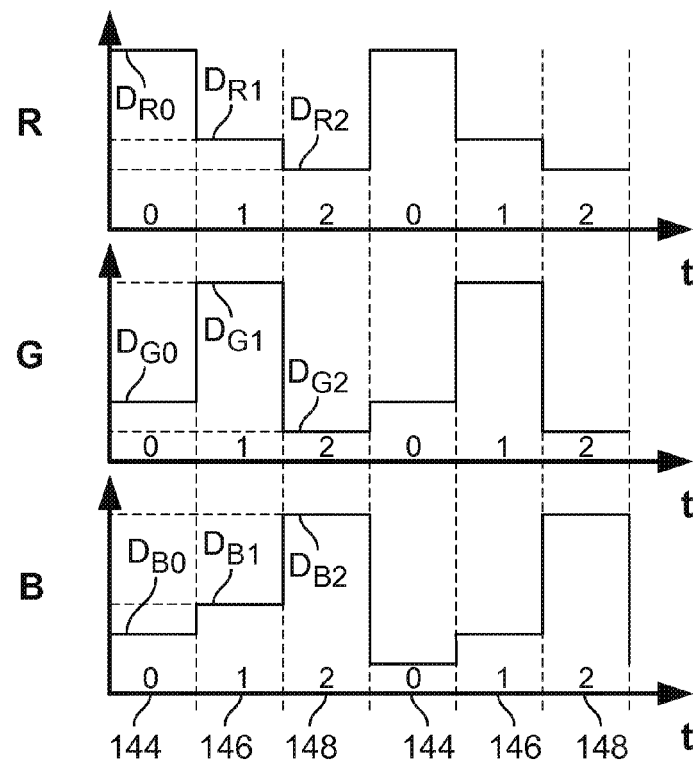

FIGS. 2O-2Q are illustrative graphs of brightness of red (R), green (G), and blue (B), as a function of time t. The brightness amplitude illustrated in FIGS. 2O-2Q can also be considered as amplitude of voltage applied to, for example, red, green, and blue LEDs 152, 154, 156 (see FIG. 1A).

FIG. 2 shows brightness waveforms corresponding to FIG. 2A, 2C, and 2E or FIG. 2K as prior art. Light emitted by a display device 100 can be time-divided into a red color frame 144 at times t=0, a green color frame 146 at times t=1, and a blue color frame 148 at times t=2, as discussed above regarding FIG. 1B. The LEDs 152, 154, 156 can be configured to pulse between on states as $D_{RON}$, $D_{GON}$, and $D_{BON}$, respectively, and off states, such as minimum values.

FIG. 2P shows brightness waveforms corresponding to FIGS. 2B, 2D, and 2F, 2M, and 2N. The LEDs 152, 154, 156 can be configured to pulse between on states such as $D_{RON}$, $D_{GON}$, and $D_{BON}$ and off states such as $D_{ROFF}$, $D_{GOFF}$, and $D_{BOFF}$, respectively. Driving the LEDs 152, 154, 156 can include applying a direct current (DC) offset voltage or voltages, which can be constant or substantially constant over time. For example, while the LEDs 152, 154, 156 are part of a display system 100 that is active, a brightness of each of the red, green, and blue LEDs 152, 154, 156 during the off state can be greater than a minimum achievable brightness of the LEDS 152, 154, 156. In some implementations, the minimum achievable brightness can be zero or substantially zero. In some implementations, the DC offset can add brightness to all three of the red, green, and blue LEDs 152, 154, 156 during both the on state and the off state. The DC offset can be applied over time during on states, off states, or both on states and off states, such that the LEDs 152, 154, 156 emit increased brightness over time as compared to configurations where no DC offset is applied. Added brightness can increase an overall brightness of an image displayed on, for example, the display 180. In some implementations, as illustrated in FIG. 2P, the brightness can be increased both during the on state and during the off state of each of red, green, and blue. In some other implementations, only brightness during the off state is increased. The DC offset can be set during manufacturing of a display unit 100 or can be user-adjustable after manufacturing, such as during operation. In some implementations, the DC offset can be user-selected through, for example, a graphical user interface. The user-selected DC offset can remain constant until the user provides further input, such as resetting the display unit 100 or adjusting the DC offset again.

The DC offset may desaturate colors of the image signal 110 in a manner similar to adding white light to the image signal 110 or the image displayed on the display 180. The preprocessor 120 can be configured to partially or entirely compensate for this desaturation. However, this desaturation may be an acceptable or desirable compromise for achieving relatively greater overall brightness with the display system 100. In some implementations, increased brightness of all of the red, green, and blue LEDs can desaturate colors unevenly. For example, colors having relatively low saturation may utilize a narrower color gamut without adverse visual effects. In some implementations, this uneven desaturation can be an acceptable compromise for achieving greater overall brightness of the display system 100.

Further, DC offsets $D_{ROFF}$, $D_{GOFF}$, $D_{BOFF}$ of each of the colors of red, green, and blue LEDs 152, 154, 156 can be independently controllable, respectively, such as by the user of the display system 100. For example, a DC offset may be applied to less than all of, such as only one of, or only two of, the red, green, or blue LEDs 152, 154, 156, or DC offsets $D_{ROFF}$, $D_{GOFF}$, $D_{BOFF}$ may have values not equal to one another as shown in FIG. 2P.

FIG. 2Q shows brightness waveforms according to an alternative implementation. Two DC offsets for $D_{ROFF}$, $D_{GOFF}$, $D_{BOFF}$ of red, green, and blue LEDs 152, 154, 156, respectively, can be independently controllable, respectively corresponding to time t=0, 1, and 2, such as by the user of the display system 100. The LEDs 152, 154, 156 can be configured to pulse between one on state for each as $D_{R0}$, $D_{G1}$, and $D_{B2}$ and two off states for each as $D_{R1}$, $D_{R2}$, $D_{G0}$, $D_{G2}$, and $D_{B0}$, $D_{B1}$. That is, three DC offsets $D_{R0}$, $D_{G0}$, $D_{B0}$ may be applied to the red, green, or blue LEDs 152, 154, 156 at red timing t=0, three DC offsets $D_{R1}$, $D_{G1}$, $D_{B1}$ may be applied at green timing t=1, and three DC offsets $D_{R2}$, $D_{G2}$, $D_{B2}$ may be applied at blue timing t=2. These offset values can be independently controlled, determined, and adjusted, such as by the user of the display system 100. By adjusting the nine register values $D_{R0}$, $D_{G0}$, $D_{B0}$, $D_{R1}$, $D_{G1}$, $D_{B1}$, $D_{R2}$, $D_{G2}$, $D_{B2}$, color gamut can be matched to keep compatibility with any color standard or existing display devices on production or in the market.

In some circumstances, it may be desirable to adjust the DC offset to optimize a viewing experience of a particular image or set of images on the display 180. For example, in circumstances that include a bright environment, brightness may be more important to a user than accurate color reproduction, such as when displaying a computer-generated presentation. Color saturation of colors in the computer-generated presentation may carry little information and may thus be less important than, for example, legibility of written words in the presentation. In such a circumstance, the DC offset may be increased to improve overall brightness of the display system 100. In another circumstance, such as when displaying photographs of real-world settings, accurate reproduction of color may be more important than enhancing overall brightness. In such a circumstance, the DC offset may be decreased or eliminated to improve color reproduction by the display system 100. However, applying a DC offset may be useful for displaying real-world colors, e.g., colors of real physical objects visible to a human observer, because many such colors may have relatively low color saturation.

The DC offset can be used to optimize other properties, as well. For example, a color temperature of an image can be optimized according to user preference, viewing conditions, or some other parameters. For example, a desired color temperature may be between about 6300 degrees Kelvin (K) and about 10,000K, such as about 8200K. As another example, the DC offset can be used to optimize power consumption of the display system 100, such as by minimizing an amount of electrical power required to achieve a particular display brightness.

The DC offset can also be used to compensate for wavelength shift of the light source 150, such as of the LEDs 152, 154, 156. For example, the LEDs 152, 154, 156 may generate light having different wavelength characteristics, that is, different color, in the "on" state as compared to the "off" state. Wavelength characteristics of light generated from the LEDs 152, 154, 156 may also vary with temperature of the LEDs 152, 154, 156. These effects of temperature and of switching between the "on" state and the "off" state may be referred to as wavelength shift. DC offsets applied to each of a plurality of light generating elements of the light source 150, such as the LEDs 152, 154, 156, can be adapted to compensate for wavelength shift. Another technique for compensating for wavelength shift can include changing ratios of duration of each color frame 144, 146, 148. For example, ratios of time that each of the LEDs 152, 154, 156 are in the "on" state can be adjusted. Additional techniques can include cooling the light source 150, such as the LEDs 152, 154, 156 to limit a temperature range thereof or preprocessing the image signal 110 to compensate for wavelength shift.

The DC offset can also be used to adjust a color gamut to match existing display devices or existing industry standard specifications because the color gamut using LEDs as light generating element is typically very wide and can cover and include almost all existing display devices.

In some implementations, using an offset as described with respect to a DC offset can be implemented using a constant current offset rather than a constant voltage offset.

Figure 2R:
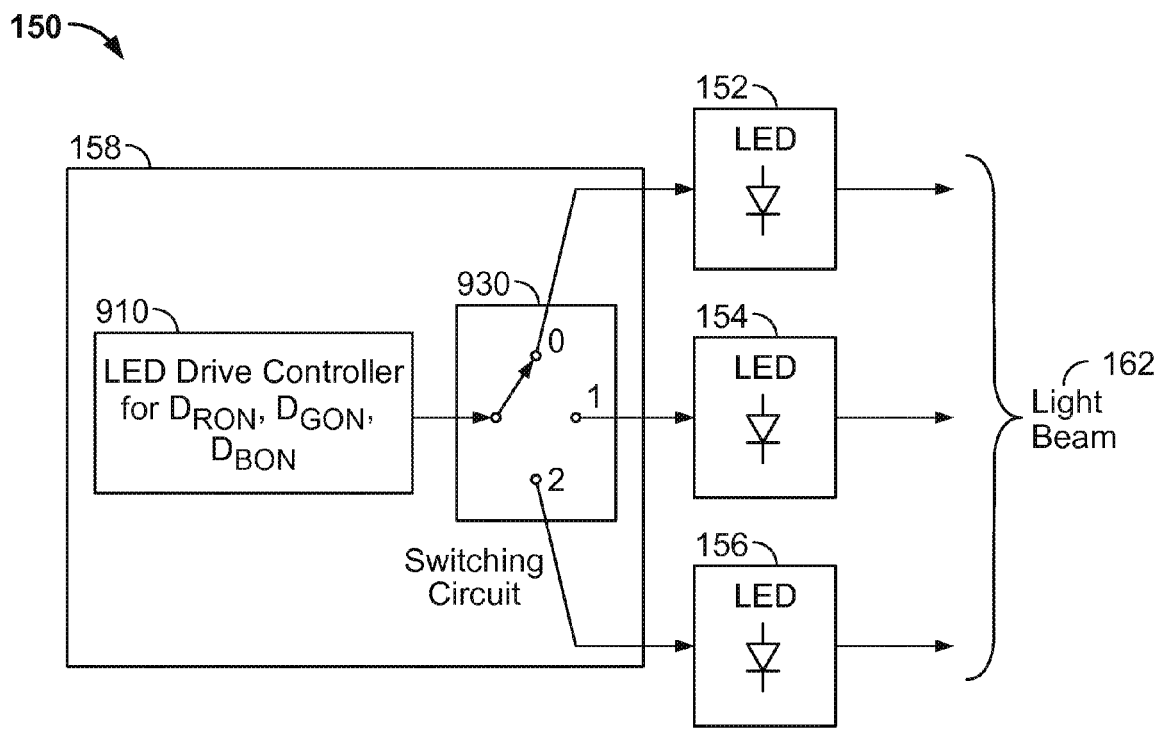
FIGS. 2R and 2S are block diagrams of an example light source and LED drive controller in prior art systems.

FIGS. 2R-2U are detailed block diagrams of implementations of the light source 150 including LEDs 152, 154, 156 as light generating elements and LED drive controller 158. Referring to FIG. 2R, the light source 150 includes the LEDs 152, 154, 156. The LED drive controller 158 includes a common LED drive controller 910 that is configured to control DC offsets $D_{RON}$, $D_{GON}$, $D_{BON}$ and a switching circuit 930.

Figure 2S:
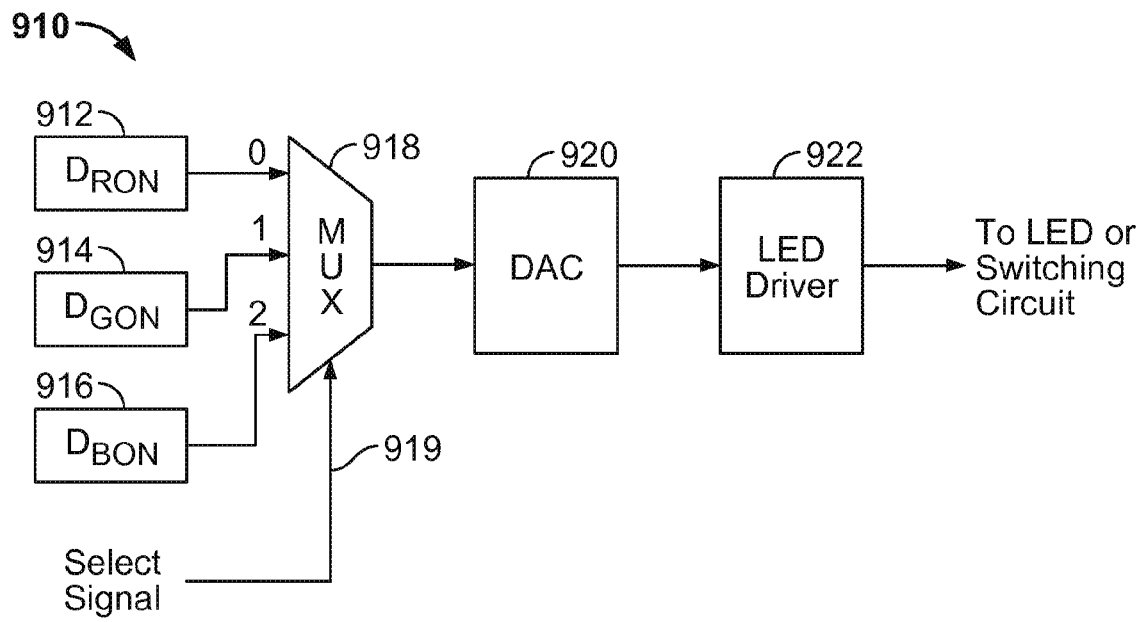

FIG. 2S is a block diagram of an implementation of the common LED drive controller 910. The common LED drive controller 910 has three data registers to set offset values for $D_{RON}$, $D_{GON}$, $D_{BON}$. These offset values are selected by a multiplexer 918 ("MUX 918"), which can be a conventional three-to-one multiplexer, at timing t=0, 1, or 2 according to a select signal 919. The offset value selected by the MUX 918 is converted to an analog signal by digital-to-analog converter 920 ("DAC 920"), and an LED driver 922 amplifies this analog signal to LED drive offset voltage or current. The output of the common LED drive controller 910 is selected by switching circuit 930 at the same timing t=0, 1, or 2 as the select signal 919 and is provided to a corresponding LED. The brightness waveforms of light beam 162 output from this light source 150 correspond to FIG. 2O.

Figure 2T:
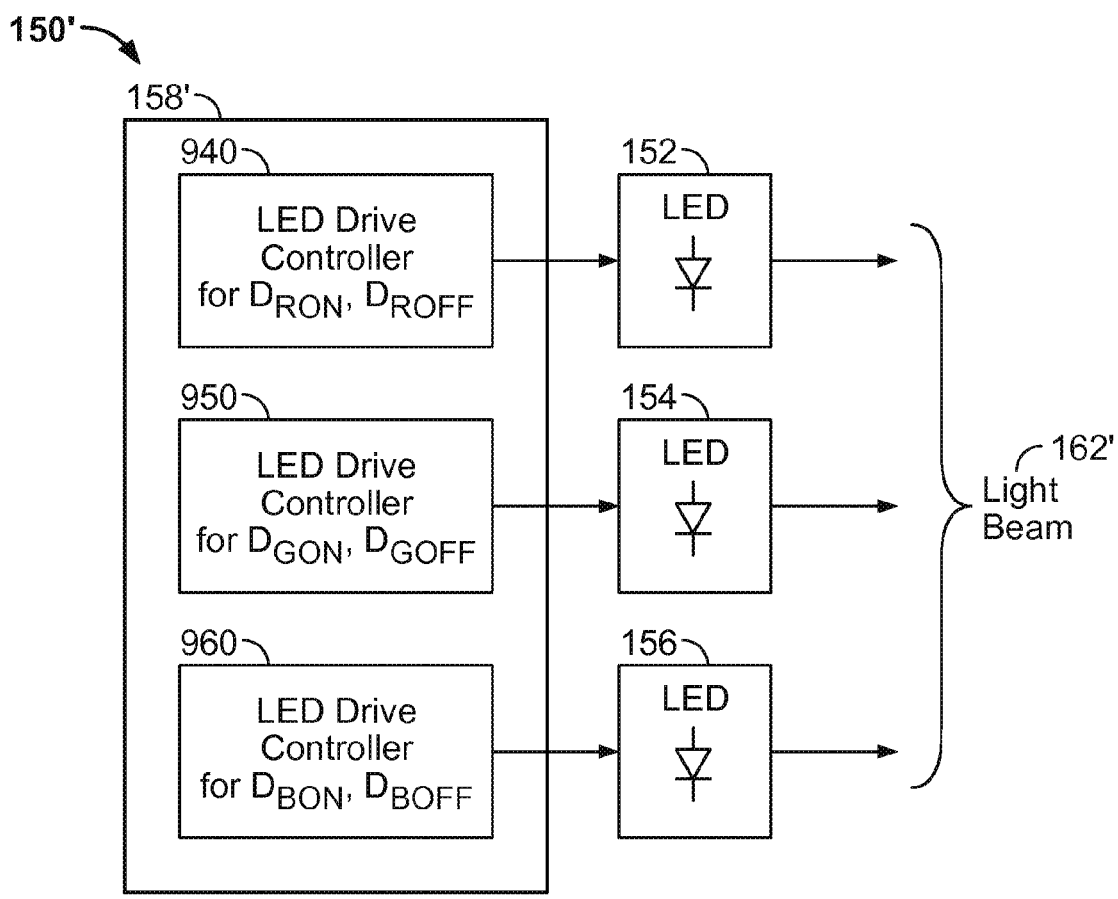
FIG. 2T is a block diagram of an example light source and LED drive controller according to an implementation of a display device.

Referring to FIG. 2T, an implementation of an alternative light source 150' includes the LEDs 152, 154, 156 and an alternative LED drive controller 158'. The LED drive controller 158' includes red LED drive controller 940, green LED drive controller 950, and blue LED drive controller 960. The LED drive controllers 940, 950, 960 include two data registers for each on state and off state offset value, namely $D_{RON}$, $D_{ROFF}$, $D_{GON}$, $D_{GOFF}$, $D_{BON}$, $D_{BOFF}$. The LED drive controllers 940, 950, 960 are configured with common LED drive controllers similar to the common LED drive controller 910 shown in FIG. 2S except the common LED drive controllers used with the LED drive controllers 940, 950, 960 each include two data registers and a two-to-one multiplexer instead of three data registers and a three-to-one multiplexer. The LED drive controllers 940, 950, and 960 select and output on state and off state voltages or currents at corresponding timing and provide output to LEDs 152, 154, 156 in parallel, respectively. The brightness waveforms of light beam 162' output from this light source 150' correspond to FIG. 2P.

Figure 2U:
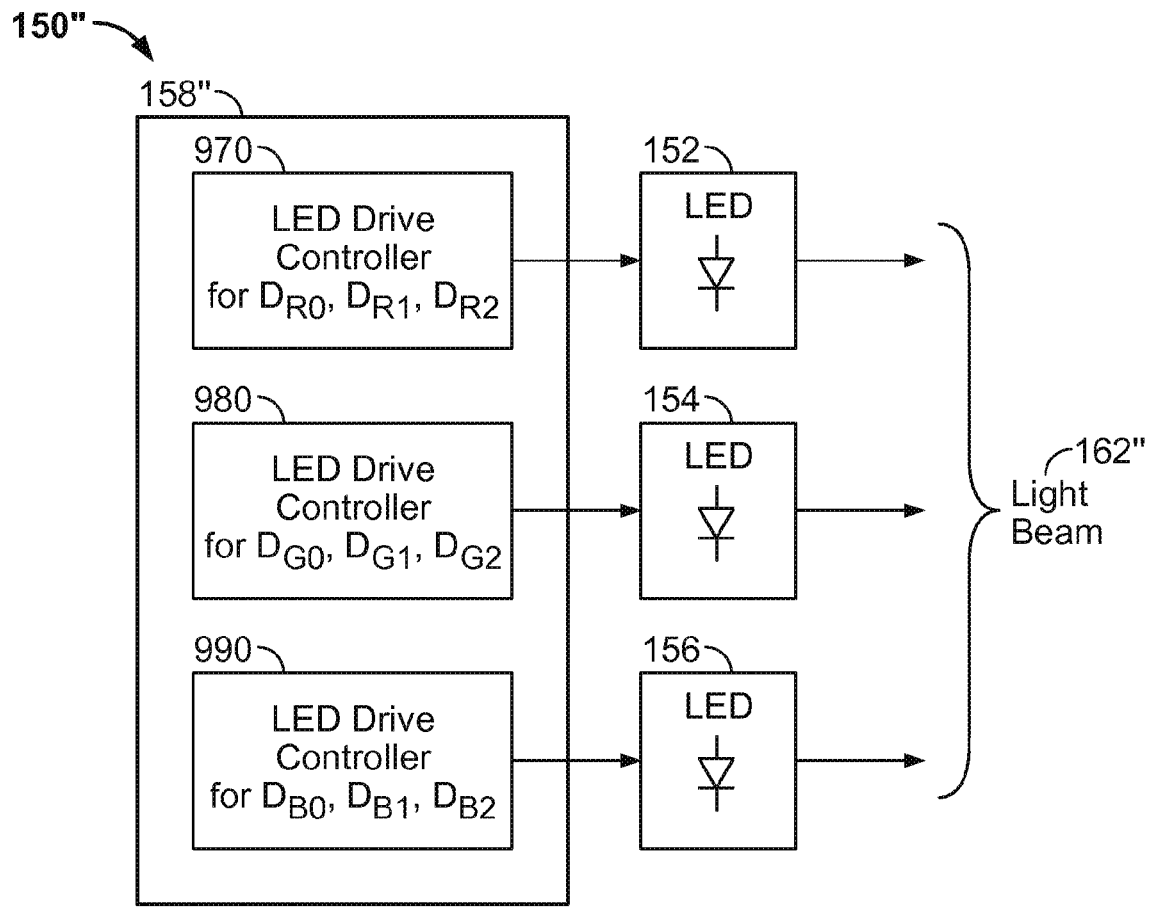
FIG. 2U is a block diagram of an example light source and LED drive controller according to an alternative implementation of a display device.

Referring to FIG. 2U, another implementation of an alternative light source 150" includes the LEDs 152, 154, 156 and an alternative LED drive controller 158". The LED drive controller 158" includes red LED drive controller 970, green LED drive controller 980, and blue LED drive controller 990. The LED drive controllers 970, 980, 990 each include three data registers, one for each timing offset value, t=0, 1, and 2. The LED drive controllers 970, 980, 990 are configured with common LED drive controllers similar to the LED drive controller 910 shown in FIG. 2S except the common LED drive controllers used with the LED drive controllers 970, 980, 990 each include three data register, one containing an on state value and two containing off state values. The LED drive controllers 970, 980, 990 select and output on state and off state drive voltages or currents at corresponding timing and provide output to LEDs 152, 154, 156 in parallel, respectively. The brightness waveforms of light beam 162" output from this light source 150 correspond to FIG. 2Q.

The light source 150 can be configured to control an amount of the substantially constant offset voltage or current. For example, the offset voltage or current can be selected to optimize brightness, saturation, color temperature, power, or some other property. The offset voltage or current may be selected such that a full brightness range of the light generating element can be used, e.g., so that a maximum brightness of the light generating element is achieved or substantially achieved. That is, for example, where LEDs 152, 154, 156 are used, the offset voltage or current can be selected such that a full range of achievable brightness of one or more of the LEDs 152, 154, 156 is used when displaying an image. In some implementations, the amount of the offset voltage or current can be determined by a light source 150. Alternatively, the offset voltage or current can be set by a user of the display system 100 or can be based upon a predetermined system parameter in the light source 150. System parameters can include, for example, a temperature of the LEDs 152, 154, 156 or a temperature of some other light generating element. System parameters can also include a nature of information to be displayed by the display system 100. For example, color saturation of colors in a computer-generated presentation may carry little information and may thus be less important than, for example, legibility of written words in the presentation, as discussed above.

In display systems 100 having multiple light generating elements as part of the light source 150, such as LEDs 152, 154, 156, an offset voltage or current can be applied to each of the light generating elements independently. For example, each of the LEDs 152, 154, 156 can have associated therewith a separate offset voltage or current. Each of these separate offsets can be independently optimized or can be selected by a user in the manners discussed above.

Using an offset voltage or current can also reduce electrical power consumption of the light source 150. For example, applying an offset voltage or current, such as a DC offset voltage, can improve power efficiency of the light source 150. For example and without being limited to any particular theory, power efficiency of light generating elements such as LEDs 152, 154, 156 may be greater at a power level or brightness that is less than full power or brightness. Applying an offset voltage or current, such as a DC offset, may thus facilitate achieving a particular brightness using relatively less power than where no offset voltage or current is applied. Also, in some implementations, switching light generating elements such as LEDs 152, 154, 156 between an "on" state and an "off" state may involve a loss or "bleed" of power necessary to effect sufficiently rapid switching between the "on" state and the "off" state for use in the display system 100. Applying an offset voltage or current, such as a DC offset, may reduce an amount of power that is lost or "bleed" during switching between the "on" state and the "off" state. Again without being limited to any particular theory, applying the offset voltage or current may improve power efficiency by utilizing, for brightness, power that might otherwise be lost or bled.

The following explanations use color wheel diagrams for conceptual explanation and ease of understanding. The LED light source can be used for the light generating elements in implementations shown by FIGS. 2P, 2Q, 2T, and 2U because color wheel implementations may be unable to apply any variable offset requirement.

FIG. 2J is a diagram of a white channel, which is representative of unfiltered light that can be directed at the SLM 170. Such an implementation could be used to display a grayscale image on the display 180, such as an image with no color saturation. Alternatively, light of differing colors can be directed at the SLM 170, and such light can be time-sequenced by a color wheel or some other mechanism, such as described below.

FIG. 2K is a diagram of an RGB color wheel 260 having a red segment 262, a green segment 264, and a blue segment 266. The color wheel 260 can be part of the color filter 190 (FIG. 1). The RBG color wheel 260 can be a physical filter wheel located between the light source 150 and the SLM 170. Alternatively, the RGB color wheel 260 can be representative of time-sequencing of the red segment 262, the green segment 264, and the blue segment 266. That is, the light source 150 can time-sequentially emit red light, green light, and blue light for periods of time represented by the segments 262, 264, 266 of the RGB color wheel 260. The segments 262, 264, 266 can correspond to a red color frame, a green color frame, and a blue color frame. Where LEDs are used in the light source 150, brightness of the LEDs can be controlled to time sequence red, green, and blue light beam 162. Time sequencing of colors may result in reduced brightness of each color, however, because each color is only displayed during a portion of a time that an image frame is displayed rather than during an entire time than the image frame is displayed. It may be desirable to increase brightness of each color, as described below. The RGB color wheel 260 corresponds to the brightness waveforms in FIG. 2O.

Desaturation of a supersaturated image signal 110 can be accomplished by using the color wheels 270, 280, and 290 in FIGS. 2L-2N. Because the human eye integrates the segments 272, 274, 276, 278, the segments 282, 284, 286, and the segments 292, 294, 296 over time, intensity of the red color in the red color frame 144 is desaturated by green and blue light in the green and blue color frames 146, 148.

FIG. 2L is a diagram of a color wheel 270 having a red segment 272, a green segment 274, a blue segment 276, and a white segment 278. The red, green, and blue segments 272, 274, 276 illustrated in FIG. 2L can be about half as large as the red, green, and blue segments 262, 264, 266 illustrated in FIG. 2K. The white segment 278 can occupy a remainder of the color wheel 270. Like the segments described with respect to FIG. 2K, segments of the color wheel 270, including the white segment 278, can be part of a physical color wheel or can represent a time-sequenced portion of an image frame. That is, an image frame can include a red color frame, a green color frame, a blue color frame, and a white color frame. The white segment 278 can pass white light unfiltered such that little or no loss of light intensity occurs when source light 160 is directed at the white segment 278 of the color wheel 270. Because white light is passed through the color wheel 270 as part of time-sequential color frames of an image, an overall brightness of an image can be increased.

FIG. 2M is a diagram of a color wheel 280 in which each RGB color has a white light component. That is, the color wheel 280 includes a red and white segment 282, a green and white segment 284, and a blue and white segment 286. This arrangement can have a similar effect as inclusion of a white segment, as described with respect to FIG. 2L. The inclusion of white light in each of the segments 282, 284, 286 can be achieved in various ways. As one example, a filter, such as a red filter, can pass some light of other colors, such as green light and blue light. As another example, a predominantly red filter can include a filter portion, such as a window, that allows light of other colors, such as green and blue, to pass through. As a further example, a light source can emit multiple colors of light, such as, during a red color frame, green light and blue light in addition to red light. The RGB color wheel 280 can correspond to the brightness waveforms in FIG. 2P.

FIG. 2N is a diagram of a color wheel 290 in which each RGB color segment includes light of other colors. For example, the color wheel 290 is representative of an implementation of a display system 100 including a light source 150 that includes red, green, and blue LEDs 152, 154, 156. The color wheel 290 includes a red segment 292, a green segment 294, and a blue segment 296. The three segments can represent segments of time where the LEDs are time multiplexed to generate light for each of the red, green, and blue color frames 144, 146, 148. Each of the three segments 292, 294, 296 includes a predominant intensity of one color and lesser intensities of other colors. For example, the red segment 292 predominantly includes red, represented by a capital letter R. The red segment 292 also includes lesser intensities of green and blue, represented by a lower case g and b, respectively. The RGB color wheel 290 can correspond to the brightness waveforms in FIG. 2P.

Figure 2V:
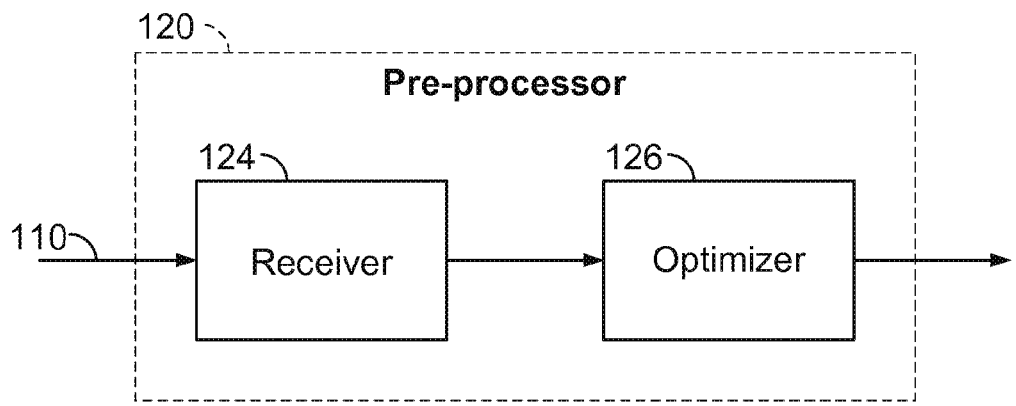
FIG. 2V is a block diagram of an example preprocessor according to an implementation of a display device.

FIG. 2V is a block diagram of a preprocessor 120 including receiver 124 and optimizer 126. The preprocessor 120 can be configured to supersaturate the image signal 110 to compensate for the desaturation described in this disclosure, if desired. Details of this preprocessing are described herein, such as with regard to FIGS. 5A-5G, 6, and 7.

Figure 3A:
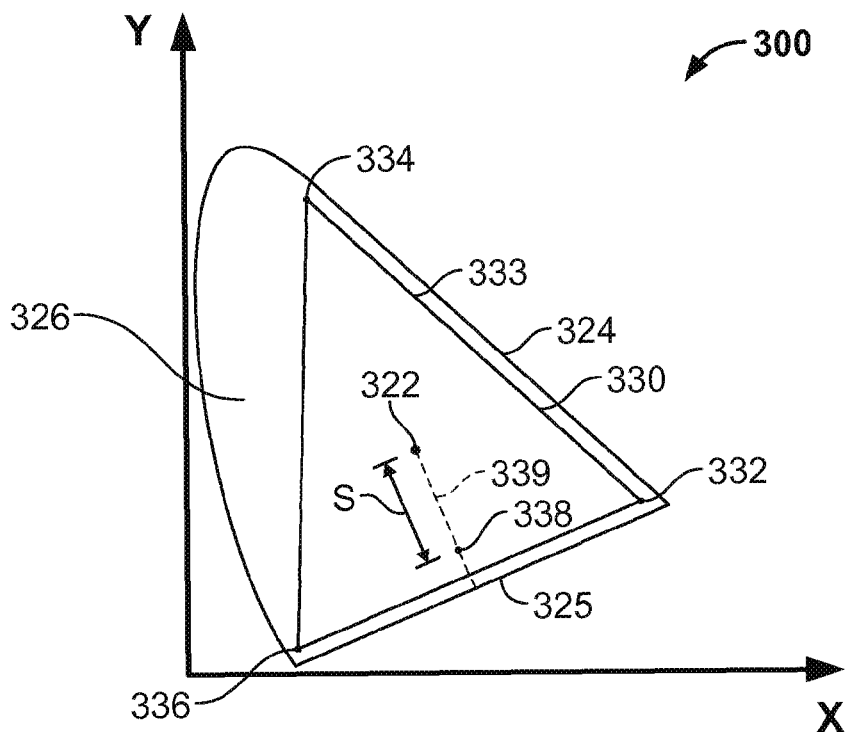
FIG. 3A is a chromaticity diagram of a color gamut in prior art systems.

FIGS. 3A-3D are chromaticity diagrams of a color gamut 300. Referring to FIG. 3A, the gamut 300 represents, in an "xy" space, all colors 326 that are visible to a human eye. A curved edged 324 of the gamut represents pure spectral colors. A straight edge 325 of the gamut can be referred to as the "purple line." A white point 322 represents a mixture of colors that appears white to a human eye. That is, the white point 322 can represent a color saturation of 0%. Where two colors within the gamut 300 are mixed, colors on a line between the two colors can be generated. For example, a red point 332 can represent a red color source made by the red light beam 220 in FIG. 2A, such as a red light generating element (e.g., LED 152). The red point 332 is not positioned on an edge of the gamut 300 because a typical color light source is not spectral. That is, a typical color light source does not include only a spectral color. Instead, a typical color light source includes a mix of colors. Similarly, a green point 334 represents a green color source made by the green light beam 230 in FIG. 2C, such as a green light generating element (e.g., LED 154). A line 333 drawn on the gamut 300 between the red point 332 and the green point 334 illustrates all colors that can be generated by mixing intensities of light having color of the red point 332 and the green point 334. A blue point 336 represents a blue light source made by the blue light beam 240 in FIG. 2E, such as a blue light generating element (e.g., LED 156). Although LEDs typically do not generate pure spectral colors, it can be noted that color LEDs typically generate light with a narrower bandwidth, and thus located closer to the spectral edge 324, than conventional CRT or LCD display phosphors. In addition, LEDs can generate light with a narrower bandwidth at much higher energy efficiency than conventional color filtering of white light. Thus, where LEDs are used, light having color saturation illustrated by the red, green, and blue points 332, 334 and 336 can be generated without use of filters and can use timing and waveforms such as shown by FIG. 2O. The triangle 330 formed by points 332, 334, and 336 in FIG. 3A shows a color gamut corresponding to a light source such as in FIGS. 2A, 2C, and 2E or a brightness waveform such as in FIG. 2O.

Mixing intensities of light having color of the red point 332, the green point 334, and the blue point 336 can produce any color within the triangle 330 formed by those three points. By way of example, a color within the triangle 330 can be a color point 338. A distance S between the white point 322 and the color point 338 represents a saturation S. Color points along a line 339 between the color point 338 and the white point 322 represent a same hue but a different saturation. That is, as compared to the color point 338, color points closer to the white point 322 are less saturated, and colors farther from the white point 322 are more saturated.

Figure 3B:
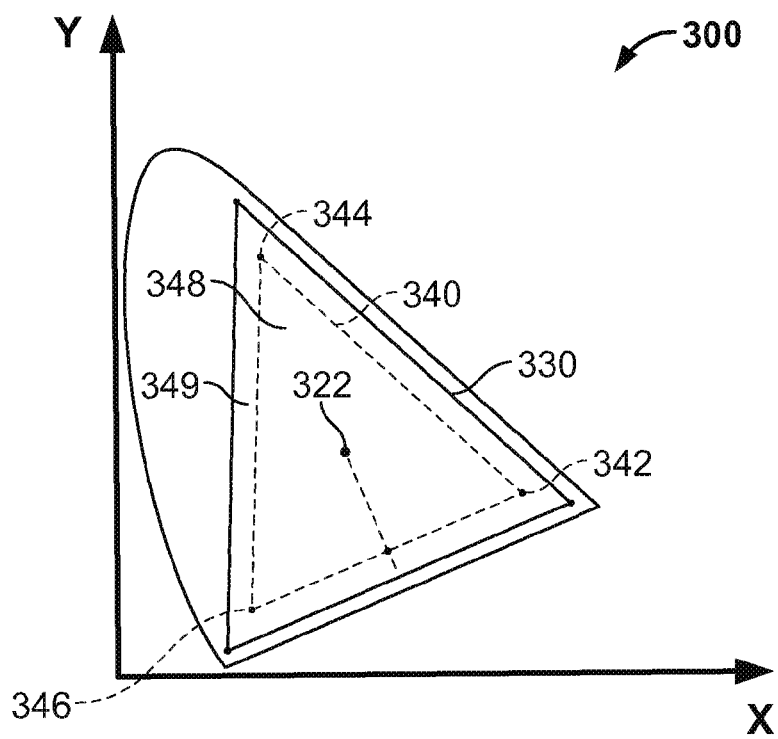
FIG. 3B is a chromaticity diagram of a color gamut according to an implementation of a display system.

Referring to FIG. 3B, the gamut 300 is shown having an inner color triangle 340 defined by an inner red point 342, an inner green point 344, and an inner blue point 346. The inner triangle 340 shows the color gamut corresponding to FIG. 2B, 2D, 2F or 2G, 2H, 2I or the light source using the timing and waveforms shown by FIG. 2P. Colors 348 contained within the inner color triangle 340 represent colors of lesser saturation than colors 349 between the outer color triangle 330 and the inner color triangle 340. Positions of the inner points 342, 344, 346 can be predetermined, such as by a manufacturer or user of the display system 100. Alternatively, a size of the inner color triangle 340 can be similarly predetermined. Limiting the saturation of colors of an image signal to within the inner color triangle 340 can permit the light source 150 to direct more light on the display 180, as discussed in more detail below.

Figure 3C:
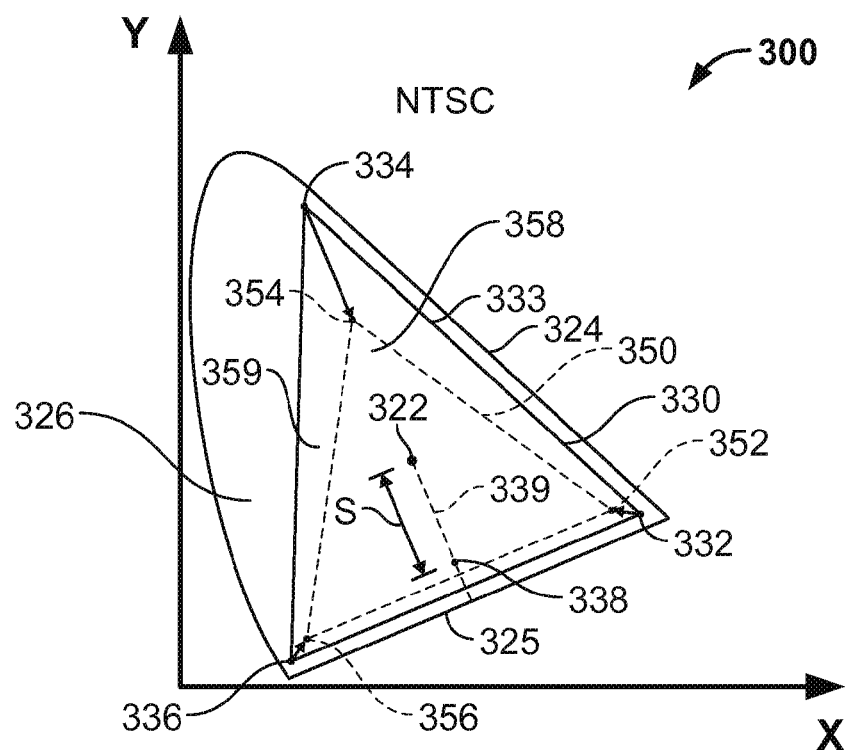
FIGS. 3C and 3D are chromaticity diagrams of color gamut according to alternative implementations of a display system.
Figure 3D:
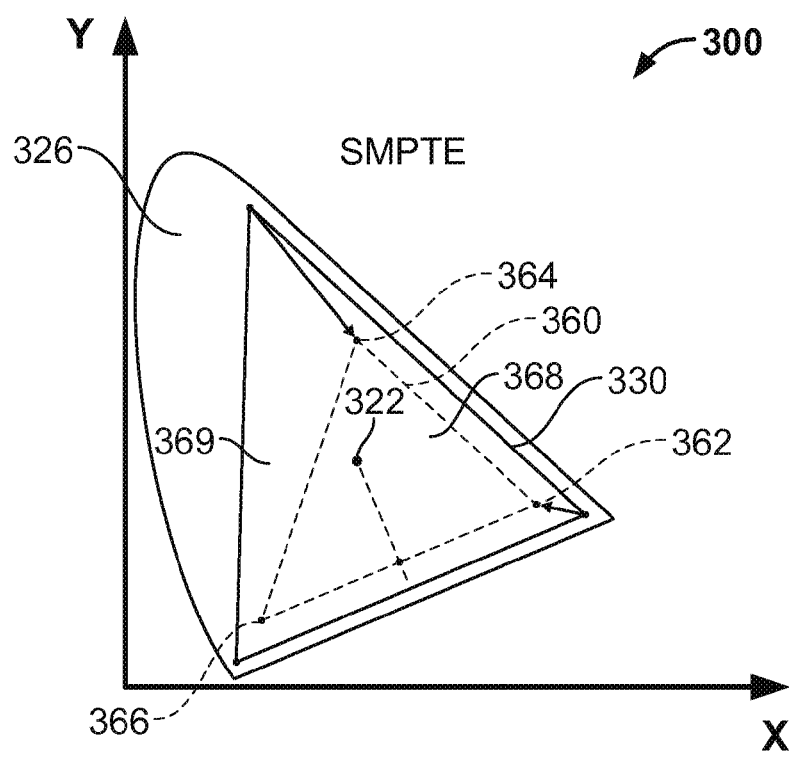

Referring to FIG. 3C, the gamut 300 is shown having an inner color triangle 350 defined by an inner red point 352, an inner green point 354, and an inner blue point 356. The inner triangle 350 shows the color gamut corresponds to the light source using the timing and waveforms shown by FIG. 2Q that is configured to one on state for each red, green, and blue ($D_{R0}$, $D_{G1}$, and $D_{B2}$) and two off states for each red, green, and blue ($D_{R1}$, $D_{R2}$, $D_{G0}$, $D_{G2}$, and $D_{B0}$, $D_{B1}$). Position of the inner red point 352 can be set to any position inside of inner triangle 350 by adjusting offset values $D_{R0}$, $D_{G0}$, $D_{B0}$ at red timing (t=0), position of the inner green point 354 can be set to any position by adjusting offset values $D_{R1}$, $D_{G1}$, $D_{B1}$ at green timing (t=1), and position of the inner blue point 356 can be set to any position by adjusting offset values $D_{R2}$, $D_{G2}$, $D_{B2}$ at blue timing (t=2). The inner triangle gamut can be adjusted to match an industry standard such as NTSC, for example, shown in FIG. 3C. Alternatively, FIG. 3D shows the inner triangle gamut 360 can be adjusted to match industry standard SMPTE, as another example. Alternatively, the inner triangles 350 or 360 can be adjusted to any existing display devices that use conventional CRT or LCD phosphors.

Figure 4A:
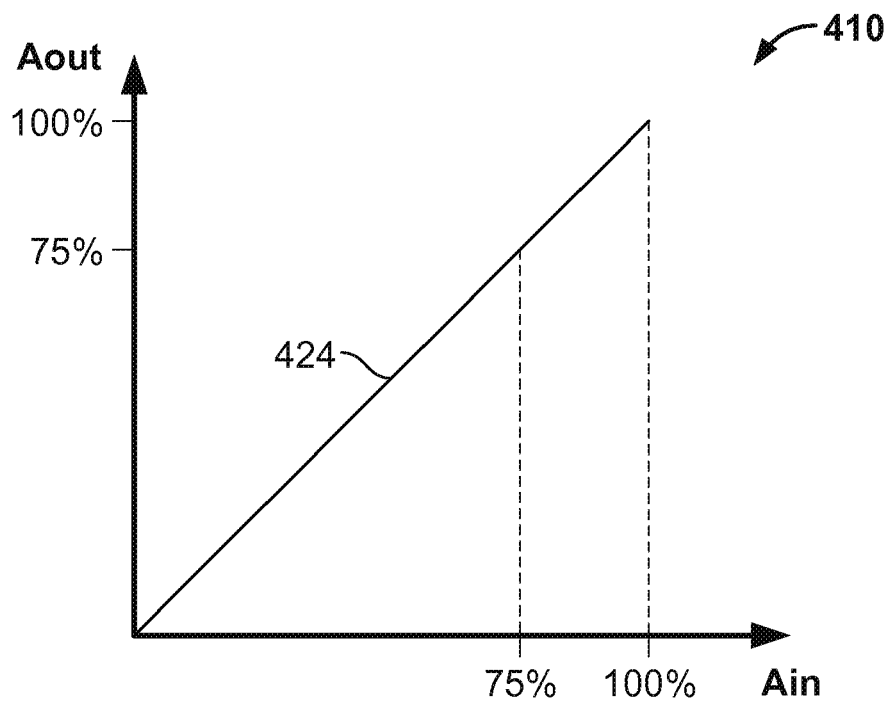
FIGS. 4A-4C are illustrative graphs of amplitude of a chrominance.
Figure 4B:
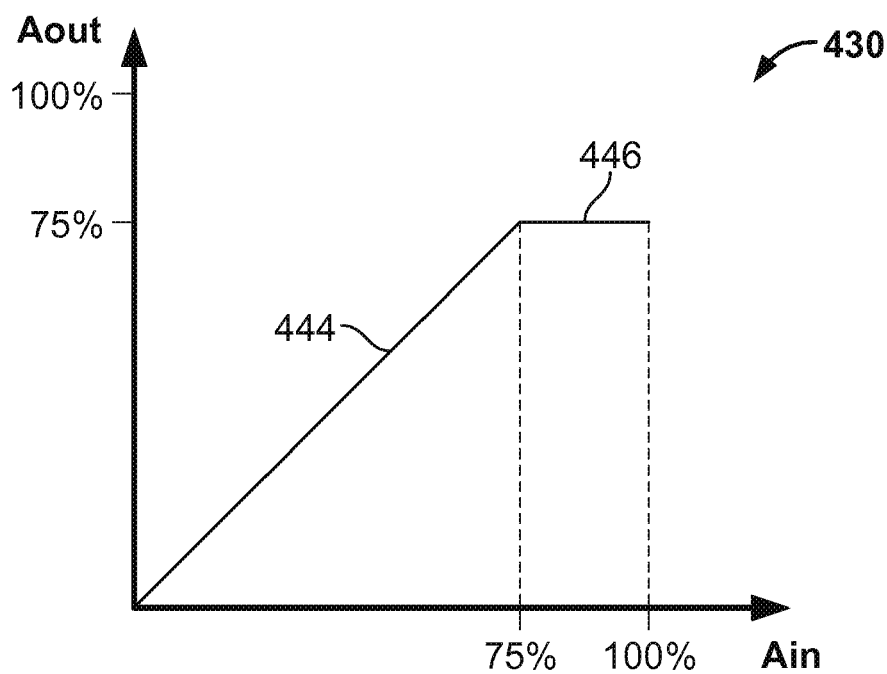
Figure 4C:
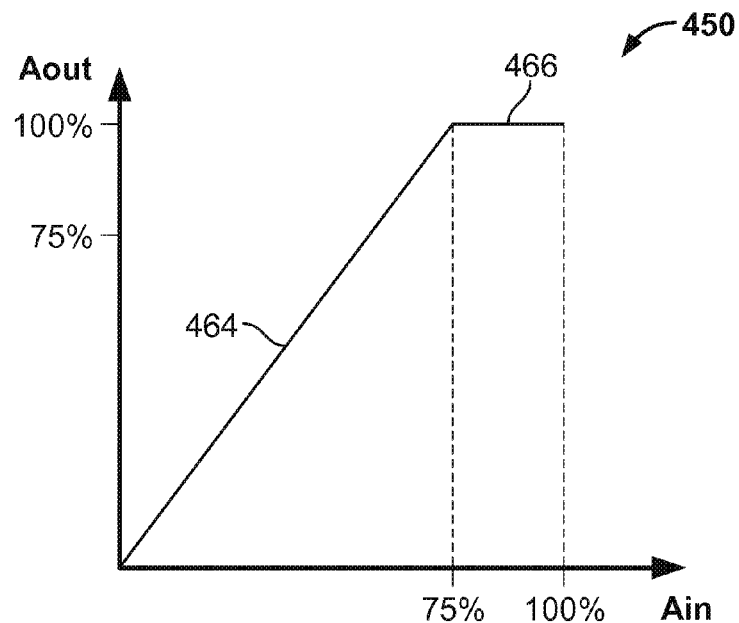

FIGS. 4A, 4B, and 4C are graphs of chroma amplitude. As discussed above, some implementations of the image signal 110 can include two chroma components. FIG. 4A shows a linear response graph 410 of linear response 424 of an output chroma amplitude $A_{out}$ to an input chroma amplitude $A_{in}$. To limit saturation to the inner color triangle 340 described with respect to FIG. 3B, the output chroma amplitude $A_{out}$ can be truncated or limited, for example, at 75%. FIG. 4B shows a truncated response graph 410 having a linear portion 444 and a truncated portion 446. For input chroma amplitude $A_{in}$ of 100% of maximum, output chroma amplitude can be 75% of maximum. Where the image signal 110 includes two chroma components, U and V, and where one component is corrected according to FIG. 4C, the other chroma component can be proportionately corrected to maintain hue. That is, if amplitude of the U component is reduced, amplitude of the V component can be proportionately reduced to maintain an original proportion between U and V. Limiting amplitudes of the U and V chroma components can be done so as to ensure that all colors in the image signal 110 are within the inner color triangle 340.

FIG. 4C shows a supersaturated response graph 450. Output chroma amplitude $A_{out}$ can vary linearly according to line 464 between 0% and 100% for input chroma amplitude $A_{in}$ between 0% and 75%. For input chroma amplitude $A_{in}$ between 75% and 100%, output chroma amplitude $A_{out}$ can be along line 466 at 100%. Supersaturating the colors can compensate for desaturation that is done to increase brightness, as described in this disclosure. In alternative implements, the line 464 and line 466 can be other than linear, such as curved or some other shape.

Figure 5A:
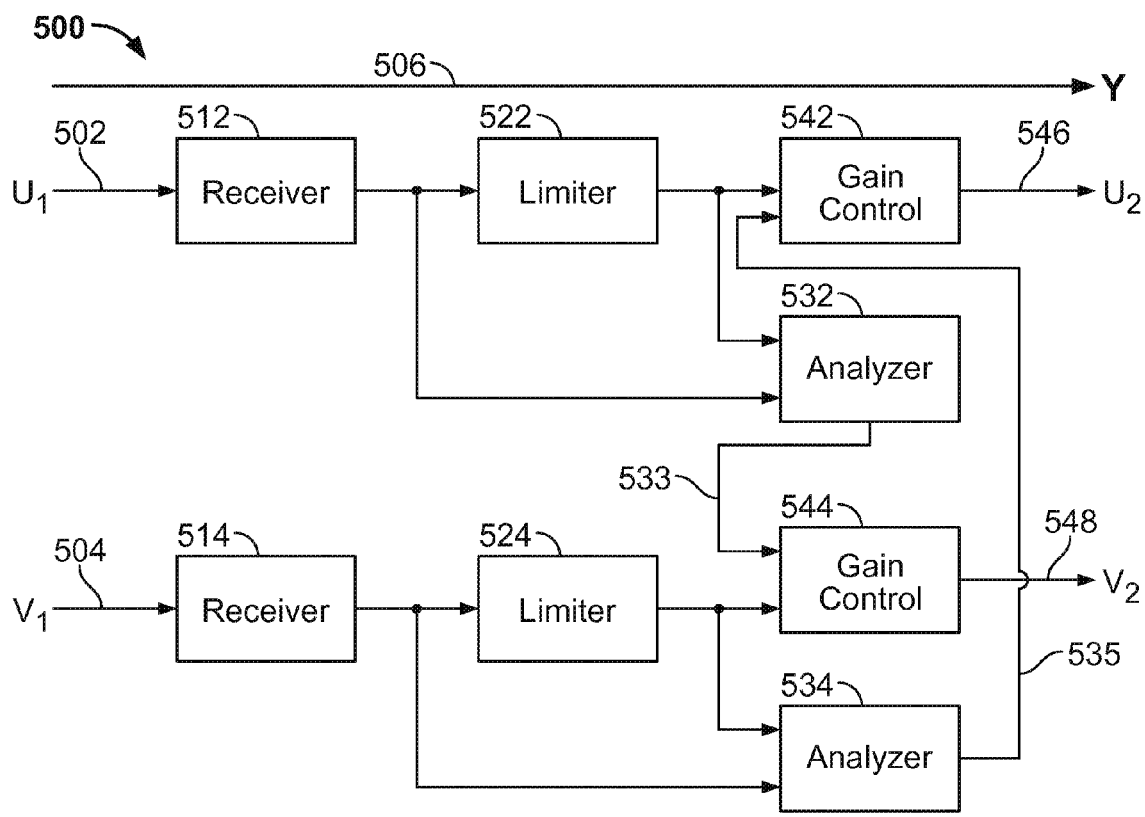
FIGS. 5A and 5B are block diagrams of preprocessors including block diagrams of a receiver and an optimizer for a display.

FIG. 5A is a block diagram of a color drive preprocessor 500 for a display. An image signal 110 (FIG. 1) includes a first input chroma component 502 ($U_1$), a second input chroma component 504 ($V_1$), and a luminance component 506 (Y). The luminance component 506 can pass through the preprocessor 500 unchanged. The first and second input chroma components 502, 506, and components resulting from modifications thereto, can be collectively referred to as the U component and the V component, respectively. A first receiver 512 can receive the U component of the image signal 110. The first receiver 512 can be in signal communication with a first limiter 522. The first limiter 522 can be configured to limit an amplitude of the U component if the amplitude thereof exceeds a predetermined limit 594 (FIG. 5C), for example, between 50% and 75%, such as 60%. A first gain control 542 can be in signal communication with the limiter 522 and generates a first output chroma component 546 ($U_2$). A first analyzer 532 can be in signal communication with the first receiver 512 and the first limiter 522. The first analyzer 532 can compare amplitudes of the U component at an output of the first receiver 512 and at an output of the first limiter 522 to generate a first limiting ratio. The first analyzer 532 can generate a first control signal 533, based on the first limiting ratio, and can be in communication with the second gain control 544.

A second receiver 514 can receive the V component of the image signal 110. The second receiver 514 can be in signal communication with a second limiter 524. The second limiter 524 limits amplitude of the V component if the amplitude of the V component exceeds a predetermined value. A second gain control 544 can be in signal communication with the limiter 524 and generates a second output chroma component 548 ($V_2$). A second analyzer 534 can be in signal communication with the second receiver 524 and the second limiter 524. The second analyzer 534 can compare amplitudes of the u component at an output of the second receiver 514 and at an output of the second limiter 524 to generate a second limiting ratio. The second analyzer 534 can generate a second control signal 535, based on the second limiting ratio, and can be in communication with the first gain control 542.

The first analyzer 532 can be in communication with the second gain control 544. If the first limiter 522 has truncated the U component, the first analyzer 532 controls the gain control 544 to adjust the second output chroma component 548 in proportion to the amount by which the limiter 522 truncated the U component. Similarly, if the second limiter 524 has truncated the V component, the second analyzer 534 controls the first gain control 542 to adjust the first output chroma component 546 in proportion to the amount by which the limiter 522 truncated the V component. By adjusting the first and second gain controls 542, 544, proper proportion between the U and V components, i.e. proper hue, can be maintained. However, where both of the U and V components are truncated, whichever component experiences the greater truncation should set the gain of the other. In short, the preprocessor 500 can be configured to ensure that the ratio of chroma components remains the same, i.e., $U_1/V_1=U_2/V_2$, after one or both chroma components have been limited.

Figure 5B:
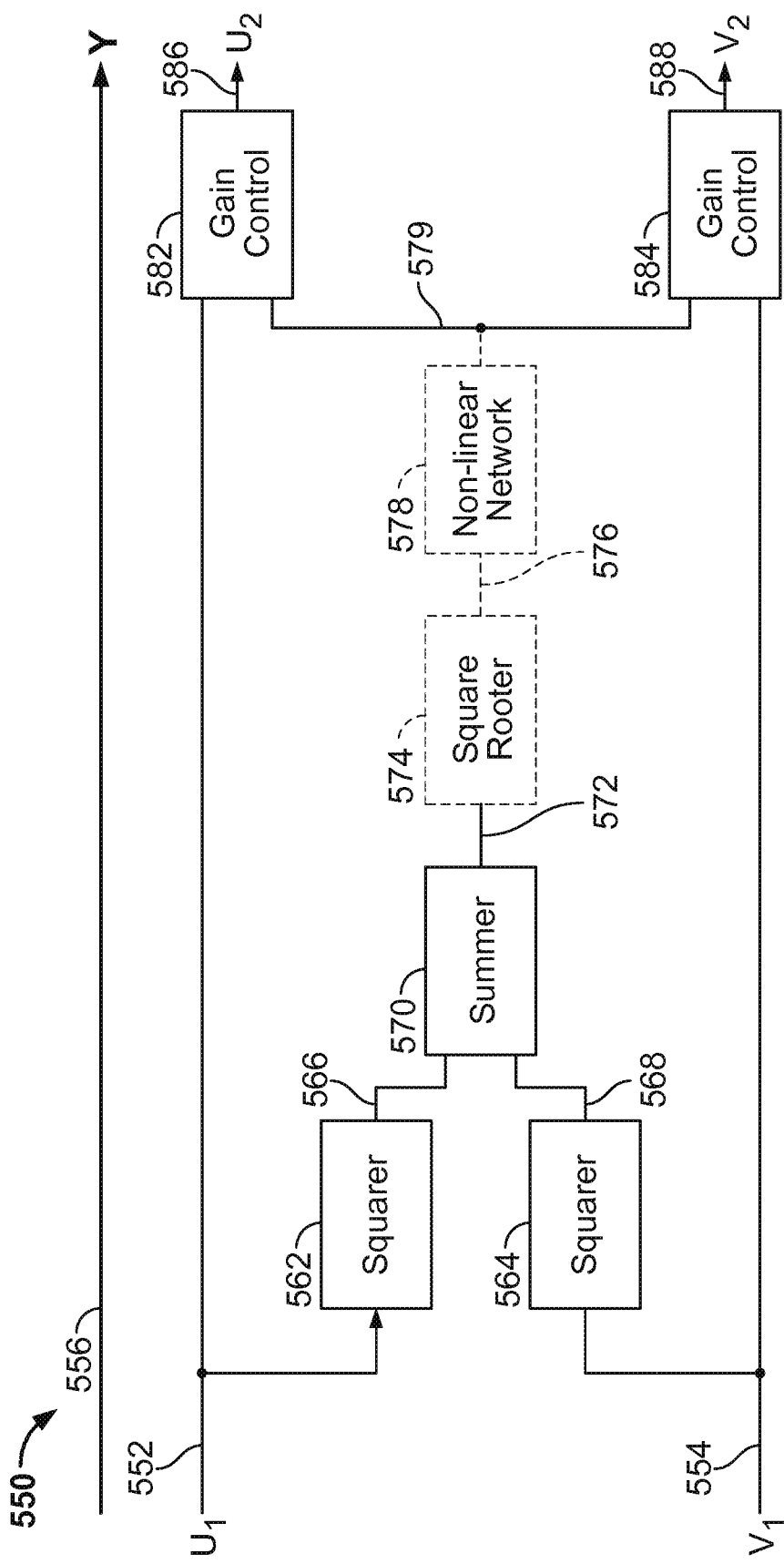

FIG. 5B is a block diagram of an alternative color drive preprocessor 550 for a display. An image signal 110 (FIG. 1) includes a first chroma component 552 ($U_1$), a second chroma component 554 ($V_1$), and a luminance component 556 (Y). The luminance component 556 can pass through the preprocessor 550 unchanged. A first gain control 582 and a second gain control 584 are in signal communication with the first chroma component 552 and the second chroma component 554, respectively.

A first squarer 562 and a second squarer 564 are in signal communication with the first chroma component 552 and the second chroma component 554, respectively. The first and second squarers 562, 564 square amplitudes of the first and second chroma components 552, 554, respectively, to generate a first squared signal 566 and a second squared signal 568. The first and second squarers 562, 564 are in signal communication with a summer 570 that can be configured to add together amplitudes of the first squared signal 566 and the second squared signal 568 to produce a squared sum signal 572. The summer 570 can be in signal communication with an optional square rooter 574 configured to take a square root of the squared sum signal 572 to produce an optional root square signal 576. An optional non-linear network 578 can be in signal communication with the square rooter 574 to convert the root square signal 576 into a control signal 579. The first gain control 582 and the second gain control 584 can be in signal communication with the non-linear network and can be responsive to the control signal 579. The control signal 579 can be configured to control the first and second gain controls 582, 584 to limit amplitudes of first and second output chroma components 586, 588 so as not to exceed a predetermined chroma limit 596 (FIG. 5C).

Figure 5C:
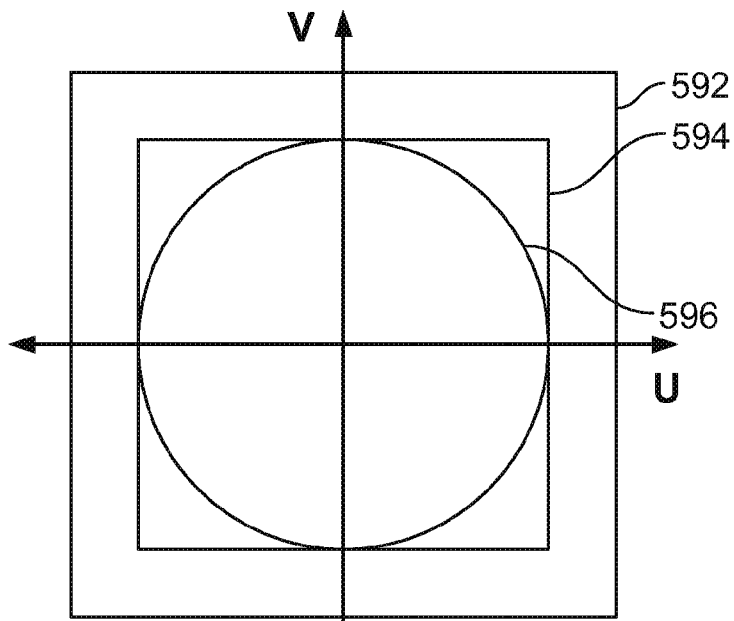
FIG. 5C is a diagram of U and V components in a YUV color space.

FIG. 5C is a diagram of U and V components in a YUV color space. Square 592 represents a range of possible colors of the image signal 110. The predetermined chroma limit 594 described with respect to FIG. 5A is shown by a square. The predetermined chroma limit 596 described with respect to FIG. 5B is shown by a circle.

Figure 5D:
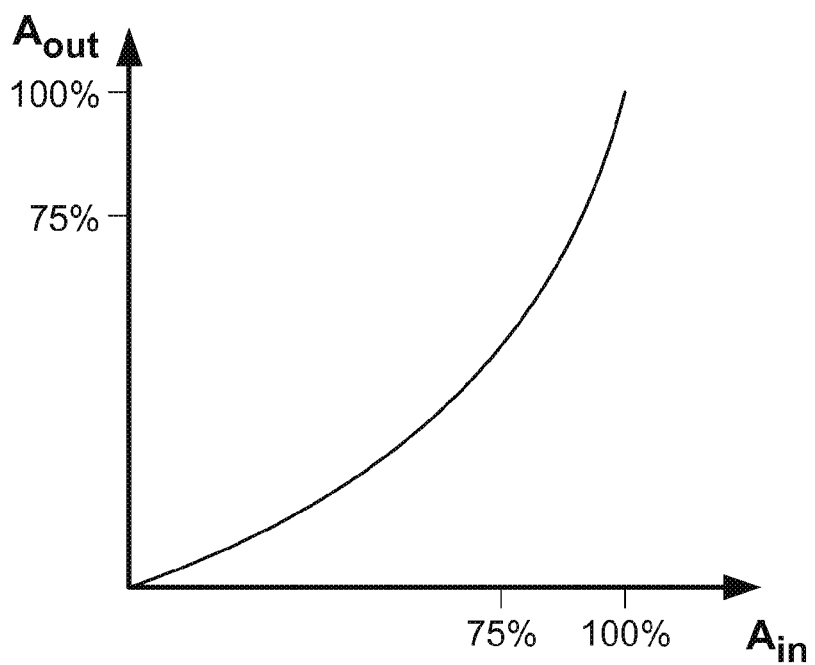
FIGS. 5D-5G are illustrative graphs of operation of an example preprocessor.
Figure 5E:
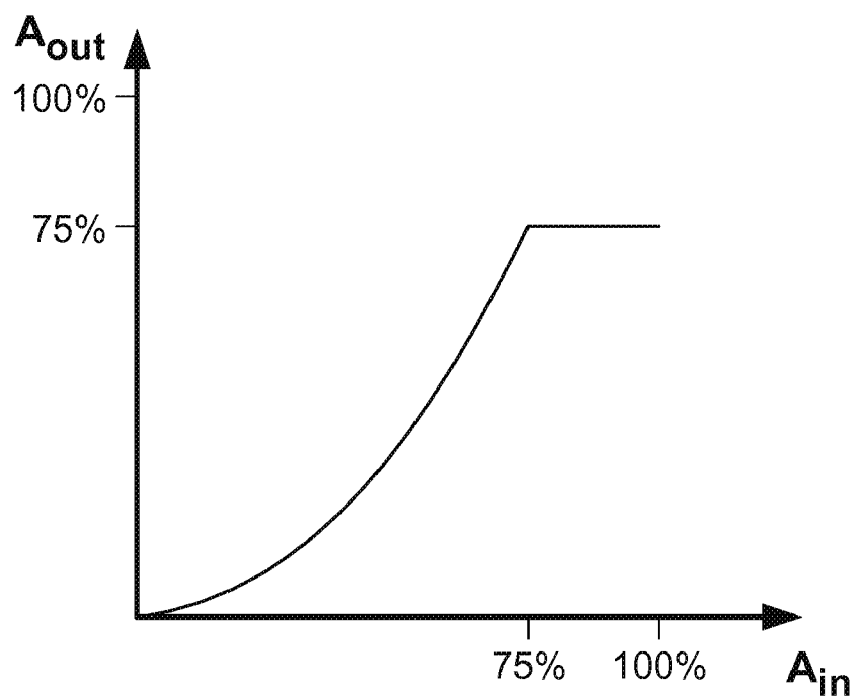
Figure 5F:
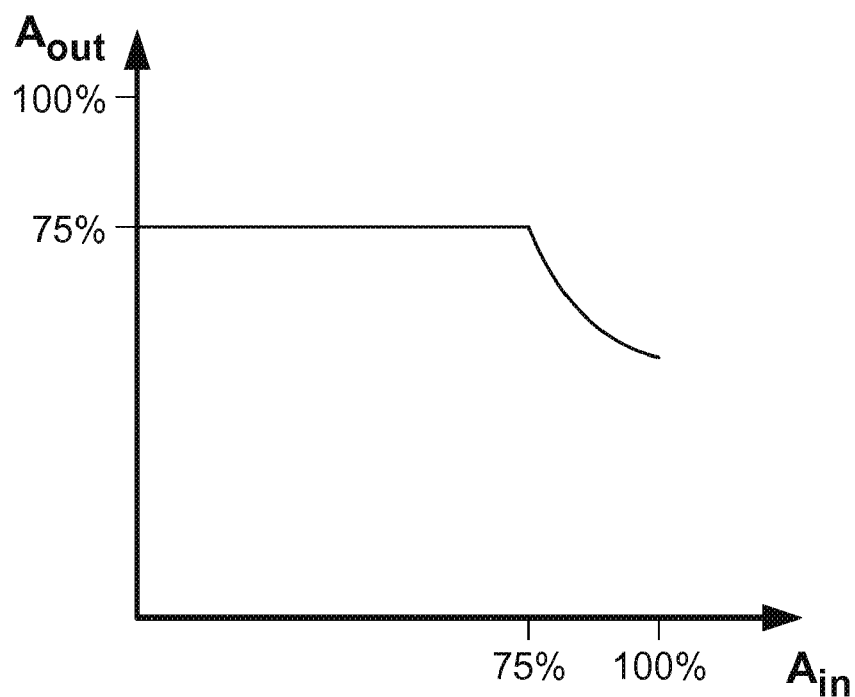
Figure 5G:
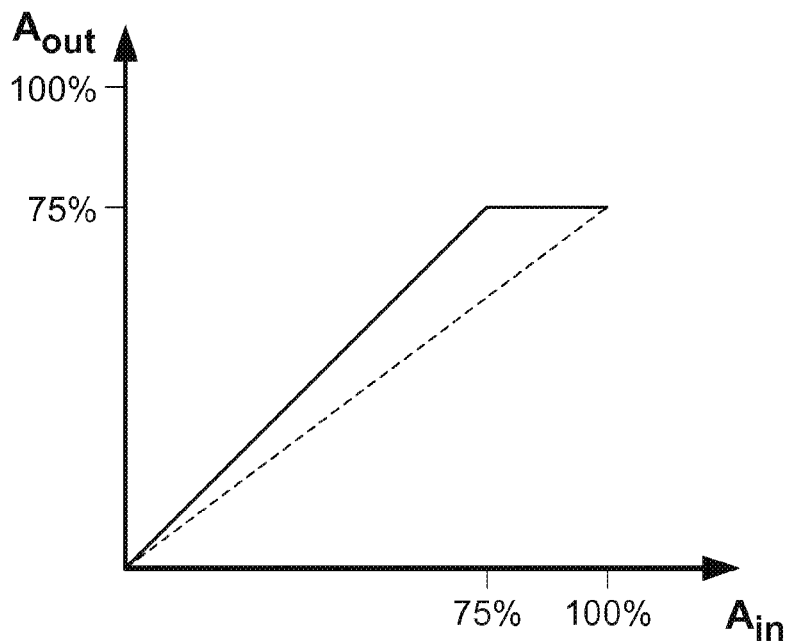

FIGS. 5D-5G are illustrative graphs of output chrominance amplitude $A_{out}$ as a function of input chrominance amplitude $A_{in}$ in an operation of an example color drive preprocessor 550 with a chroma limit 596 of 75%. The first chroma component 552 (U1) and second chroma component 554 (V1) can be squared and summed to generate the squared sum signal 572, as shown in FIG. 5D. The squared sum signal 572 can be limited as shown in FIG. 5E. From this limited signal, the optional non-linear network 578 can generate a control signal 579 as shown in FIG. 5F. The control signal 579 can be used to achieve supersaturation of an image signal 110 as shown in FIG. 5G, wherein a broken line represents the original image signal 110.

Figure 6:
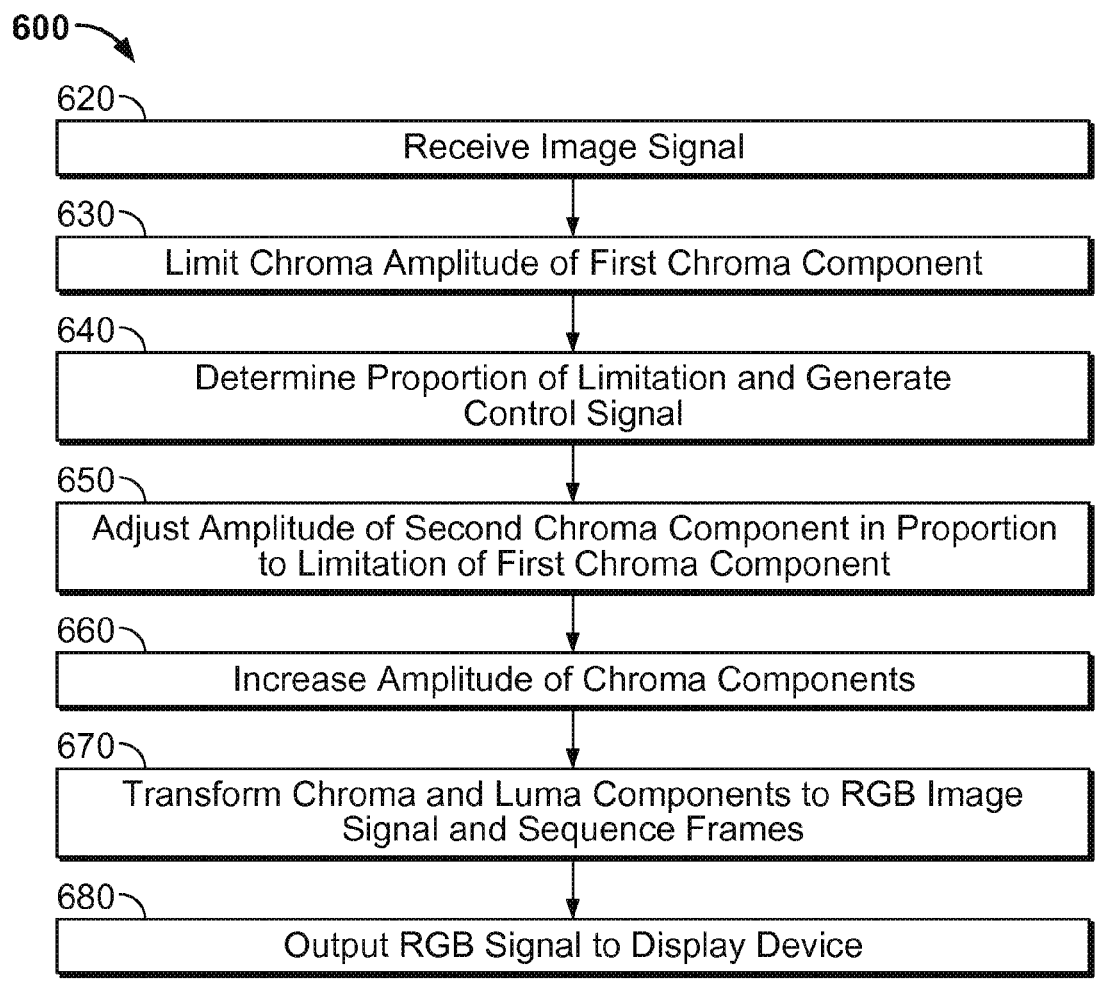
FIG. 6 is a flow chart for a method of adjusting chrominance.

FIG. 6 is a flow chart illustrating a method 600 of adjusting chroma. The image signal 110 can be received by the receiver 512 (step 620). An amplitude of the first chroma component 502 can be truncated by the limiter 522 (step 630). The first analyzer 532 can measure a proportion by which the first chroma component has been truncated and generate the first control signal 533 (step 640). The second gain control 544 can receive the first control signal 533 and adjust an amplitude of the second chroma component 504 in proportion to the truncation of the first chroma component 502 (step 650). The first and second gain control 542, 544 can then increase amplitude of the first and second chroma components 502, 504, respectively (step 660). This increase can supersaturate colors within the inner color triangle 340 (FIG. 3B). The converter 130 can transform the chroma and luma components to an RGB image signal, and the frame sequencer 140 can create time-sequential image frames 142, which can include time-sequential color frames 144, 146, 148 (step 670). A light source 150 and SLM 170 can display the RGB signal on a display 180 (step 680). To increase brightness, as compared to an unmodified image signal, and to faithfully reproduce color saturation of the original image signal 110, the SLM 170 can add desaturating color components to one, some, or all of the time-sequential color frames 144, 146, 148 (FIG. 1B). After desaturation, the resulting displayed colors can be within the inner color triangle 340.

Figure 7:
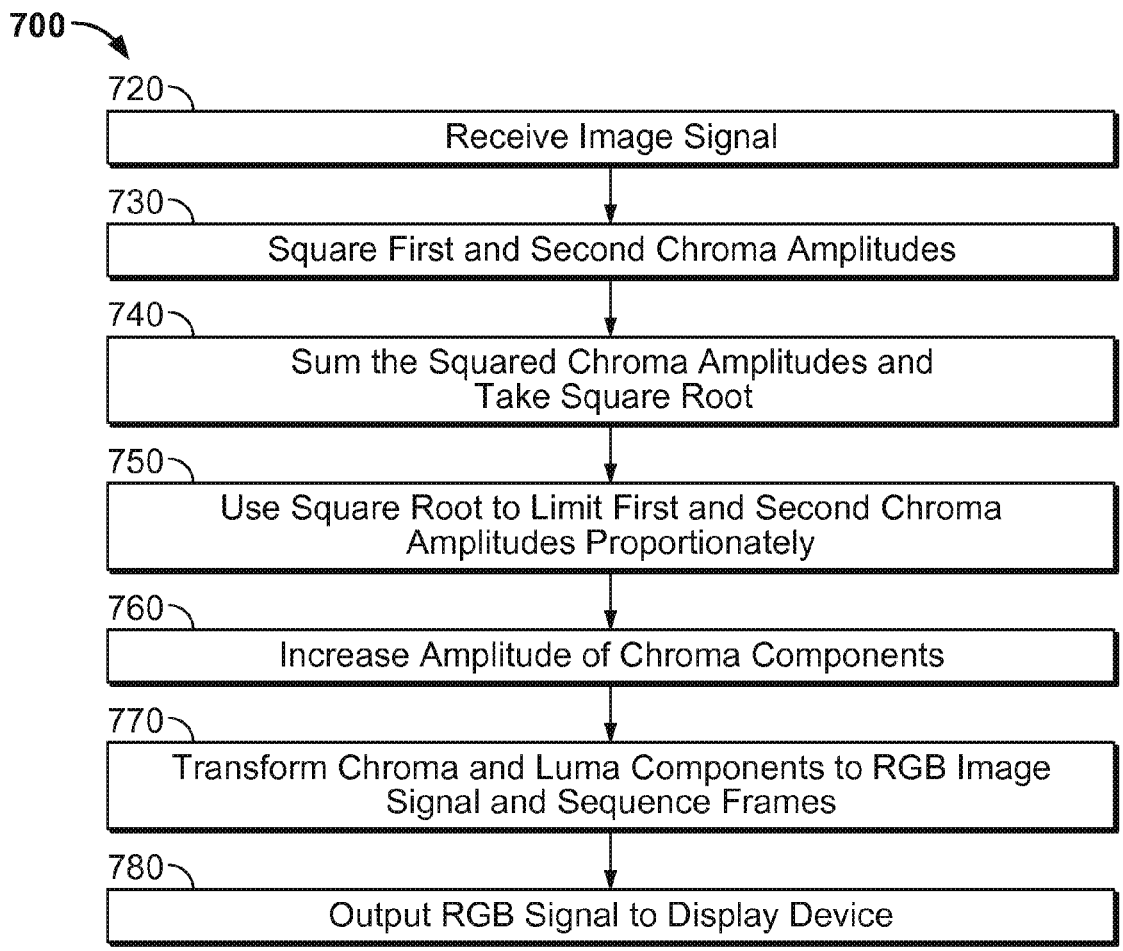
FIG. 7 is a flow chart for another method of adjusting chrominance.

FIG. 7 is a flow chart illustrating an alternative method of adjusting chroma. The image signal 110 can be received by a receiver, and the first and second chroma components 552, 554 can be squared by the first and second squarers 562, 564, respectively, to produce first and second squared signals 566, 568 (step 730). The summer 570 can sum the first and second squared signals 566, 568 to produce a squared sum signal 572. A square rooter can take a square root of the squared sum signal 572 to produce a square root signal 576 (step 740). The square root signal can be processed by a non-linear network to produce a control signal 579. The first and second gain control 582, 584 can respond to the control signal 579 to limit amplitudes of the first and second chroma components 552, 554 in proportion to one another (step 750). The first and second gain control 582, 584 can then increase amplitudes of the first and second chroma components by a predetermined amount, thereby supersaturing the image signal 110 (step 760). The converter 130 can transform the chroma and luma components to an RGB image signal, and the frame sequencer 140 can create sequenced image frames (step 770). A light source 150 and SLM 170 can display the RGB signal on a display 180, desaturating the image signal to faithfully reproduce color saturation of the original image signal 110 and thereby increasing brightness (step 780).

The preprocessing described above can result in increased color saturation that is faithful to the hues of the original image signal 110. That is, color saturation of the original image signal 110 has been limited (e.g., truncated) and supersaturated. The increases in color saturation can be proportionate in order to preserve hue of the original image. Although the signal is supersaturated, displayed color saturation can be made faithful (or partially faithful or substantially faithful) to the original image signal 110 by desaturating the color. Display can be faithful to the original image signal 110 where the ratios of Y:V, Y:U, and U:V are about the same for a displayed image as for the original image signal 110. This faithfulness to the original image signal may only be important within the inner color triangle 340 (FIG. 3B). Saturation of colors for the original image signal outside of the inner color triangle 340 may not be faithfully displayed, but because of the rarity of such colors and the usual lack of information carried by differences between highly saturated colors, unfaithfulness outside of the inner color triangle 340 can be a useful compromise. On the other hand, because the ratio U:V can be maintained, the hue of colors from the original image signal outside of the inner color triangle 340 can still be faithfully displayed. By supersaturating and then denaturing, overall brightness of a displayed image may be improved while hue is maintained.

Where image frames 142 are time multiplexed to include color frames, one image frame 142 can include a red color frame 144, a green color frame 146, and a blue color frame 148 (see FIG. 1B). Desaturation of a red frame 144, for example, can be achieved by adding intensity of green and blue to the red frame 144. That is, for example, comparing FIGS. 2A and 2G, where the intensity of red remains constant, addition of green and blue can desaturate the red. Green frames 146 and blue frames 148 can be similarly desaturated. Addition of this desaturating light may increase overall brightness of image frames 142 displayed by the display system 100.

Alternatively, or in addition, desaturation of red in an image frame 142, for example, can be achieved by increasing intensity of green in a green color frame 146 and blue in a blue color frame 148 of the same image frame 142. That is, where an image frame 142 includes a red color frame 144, a green color frame 146, and a blue color frame 148, red can be desaturated by increasing intensity within the green color frame 146 and the blue color frame 148. This desaturation can occur where a time between display of the red, green, and blue color frames 144, 146, 148 is sufficiently short that a human eye can integrate the red, green, and blue color frames 144, 146, 148 into a single perceived image frame 142.

In some implementations, desaturation can be achieved by modifying the "on" time of mirrors of an SLM 170 in color frames 144, 146, 148 without adjusting an input light beam 162. For example, an image signal 110 having only a red color component can be transformed to include a relatively small green component and blue component so that red is displayed during green and blue frames. That is, for example, mirrors of an SLM 170 can be controlled to display red-colored light during a green color frame 146 and a blue color frame 148.

Such an implementation may be suitable where, for example, a separate SLM 170 is used for each of red, green, and blue colored light.

An amount of limitation or truncation of chroma components can be adjustable. For example, where the display system 100 is in a brightly lit room, a relatively high brightness may be desired to enhance ease of viewing an image displayed by the display system 100. To achieve a relatively high brightness, an amount of limitation (e.g., truncation) of chroma can be increased. Accordingly, the degree to which the image signal 110 is supersaturated is increased, and the amount of light added to desaturate the displayed image is increased, which results in increased brightness of the displayed image. As another example, in a dimly lit room, a relatively low brightness may be needed or desired, and the amount of truncation of chroma can be decreased. The displayed image can thereby have a relatively greater possible range of color saturation but with a relatively lower brightness.

Figure 8:
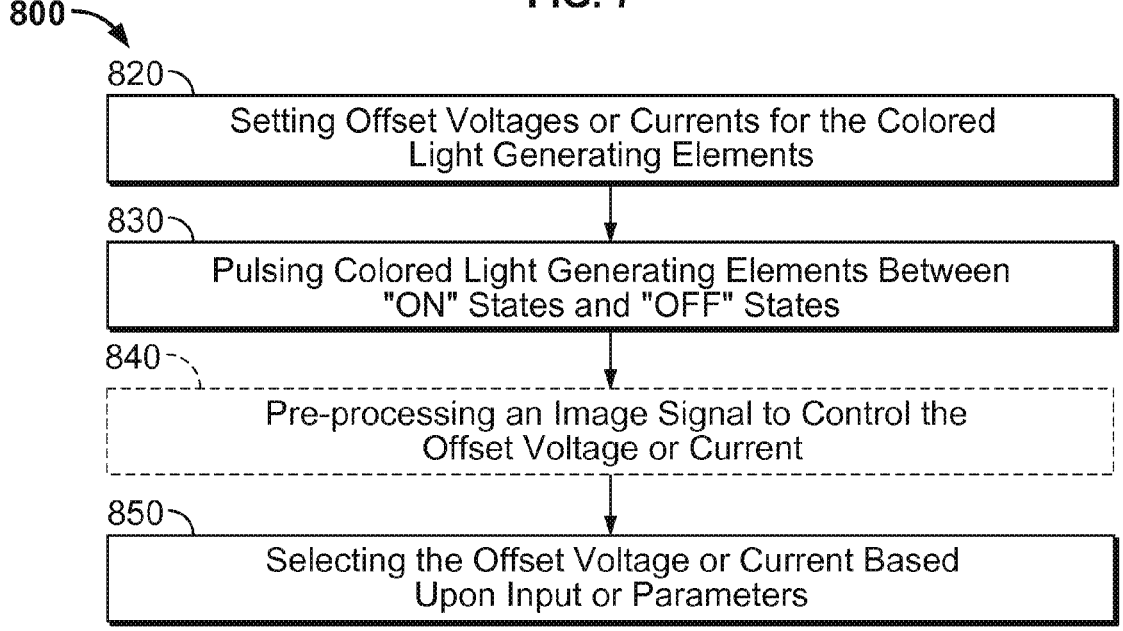
FIG. 8 is a flow chart for a method relating to controlling a light generating element.

FIG. 8 is a flow chart of a method 800 of controlling a light generating element. Offset voltages or currents can be set and prepared for application to the colored light generating elements (step 820). The colored light generating elements can be pulsed between "on" states and "off" states (step 830), as discussed above, including offset voltages or currents. Selecting of the offset voltage or current can be based upon input of a user, predetermined parameters, image signal information, or other factors (step 850), as discussed above. Optionally, preprocessing of the image signal 110 can be used to control the offset voltages or currents (step 840).

Although the modification of image signals is discussed above as implemented in digital electronic circuitry, this and other functionality could be implemented in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine readable storage media or in a propagated signal, for execution by, or to control the operation of, data processing apparatus, e.g., a programmable processor, a computer, or multiple processors or computers. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

A number of embodiments of the invention have been described. Nevertheless, it will be understood that various modifications may be made without departing from the spirit and scope of the invention. For example, an analyzer can measure a proportion between input chroma amplitudes before limitation or truncation and can adjust a proportion between output chroma amplitudes to match the proportion between input chroma amplitudes. Also, since a human eye may be more sensitive to some colors than to others, amplitudes of some colors may be limited more than others. For example, a color triangle to which an image signal is limited may be other than a straight-sided triangle and may have curved sides or be of some other shape. As additional examples, a light source may include LEDs that can each produce more than one color of light, such as red, green, and blue light, or the light source can include a plurality of lasers configured to collectively emit a plurality of wavelengths of light. Offset voltages or currents can include waveforms other than constant over predetermined time intervals. Accordingly, other embodiments are within the scope of the following claims.

What is claimed is:

1. A method, comprising:
   pulsing three colored light generating elements, one for emitting green light, one for emitting red light and one for emitting blue light, between an off state and an on state;
   applying a substantially constant offset voltage or current to each of the colored light generating elements during a predetermined time interval when the light generating elements are in an off state so as to cause each of the colored light generating elements always to emit, during the off state, some amount of light greater than a minimum amount of light that the light generating elements are capable of generating while part of an active system.

2. The method of claim 1, further comprising:
   selecting the constant offset voltage or current to compensate for wavelength shift of the colored light generating element or to optimize either brightness, saturation, color temperature, or power.

3. The method of claim 2, where selecting the constant offset voltage or current is based upon a preference set by the user.

4. The method of claim 2, where selecting the constant offset voltage or current is based upon a predetermined system parameter.

5. The method of claim 4, where the system parameter is selected from temperature of the light generating elements or nature of information to be displayed.

6. The method of claim 1, further comprising:
   controlling the amount of the substantially constant offset voltage or current with a colored light generating element controller.

7. The method of claim 6, wherein the preprocessor comprises:
   a receiver configured to receive an image signal having color saturation and brightness information; and
   an optimizer to control the saturation of the image signal based upon information from the receiver.

8. The method of claim 6, wherein the preprocessing includes limiting and non-linearly increasing color saturation of the image signal.

9. The method of claim 8, wherein the preprocessing includes substantially preserving original color hue for colors having saturation below a predetermined saturation limit.

10. The method of claim 8, wherein the preprocessing includes substantially preserving original color saturation for colors having saturation below a predetermined saturation limit.

11. The method of claim 6, wherein the constant offset voltage or current is applied to the two colored light generating elements during the off state so as to increase brightness of the two colored light generating elements over time.

* * * * *